United States Patent
Wu

(10) Patent No.: US 10,425,207 B2
(45) Date of Patent: Sep. 24, 2019

(54) PILOT TRANSMISSION METHOD, STATION AND ACCESS STATION

(71) Applicant: Huawei Technologies Co., Ltd., Shenzhen (CN)

(72) Inventor: Tao Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 109 days.

(21) Appl. No.: 15/617,913

(22) Filed: Jun. 8, 2017

(65) Prior Publication Data

US 2017/0279569 A1 Sep. 28, 2017

Related U.S. Application Data

(63) Continuation of application No. PCT/CN2014/093251, filed on Dec. 8, 2014.

(51) Int. Cl.
*H04L 5/00* (2006.01)
*H04B 7/04* (2017.01)
*H04W 72/12* (2009.01)

(52) U.S. Cl.
CPC .......... *H04L 5/005* (2013.01); *H04B 7/04* (2013.01); *H04L 5/0094* (2013.01); *H04W 72/121* (2013.01)

(58) Field of Classification Search
CPC ......... H04L 5/00; H04L 5/0094; H04L 5/005; H04W 72/12; H04W 72/121; H04B 7/04
See application file for complete search history.

(56) References Cited

U.S. PATENT DOCUMENTS

2008/0273510 A1 11/2008 Mudulodu et al.
2009/0122886 A1* 5/2009 Oketani ............... H04L 27/262
375/260

(Continued)

FOREIGN PATENT DOCUMENTS

CN 1917394 A 2/2007
CN 101288254 A 10/2008

(Continued)

OTHER PUBLICATIONS

Makhlouf et al., "Dynamic Multiuser Sub-Channels Allocation and Real-Time Aggregation Model for IEEE 802.11 WLANs," IEEE Transactions on Wireless Communications, vol. 13, No. 11, XP011564012, pp. 6015-6026, Institute of Electrical and Electronics Engineers, New York, New York (Nov. 2014).

(Continued)

*Primary Examiner* — Kyaw Z Soe
(74) *Attorney, Agent, or Firm* — Leydig, Voit & Mayer, Ltd.

(57) ABSTRACT

Embodiments of the present invention provide a pilot transmission method, a station, and an access station. The method includes: receiving, by a station, a pilot transmission notification, where the pilot transmission notification includes a pilot transmission rule of the station and a pilot transmission rule of another station on a group of continuous subcarriers; the pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases, and the pilot transmission rule of the another station includes: pilots transmitted on all subcarriers have a same amplitude and a (Continued)

same phase; and transmitting, by the station, a pilot according to the pilot transmission rule of the station.

16 Claims, 11 Drawing Sheets

(56) References Cited

U.S. PATENT DOCUMENTS

| | | | | |
|---|---|---|---|---|
| 2010/0298003 | A1* | 11/2010 | Kim | H04B 7/0452 |
| | | | | 455/450 |
| 2011/0299474 | A1* | 12/2011 | Li | H04W 16/02 |
| | | | | 370/328 |
| 2014/0198877 | A1 | 7/2014 | Van Nee | |
| 2015/0381246 | A1 | 12/2015 | Huang et al. | |

FOREIGN PATENT DOCUMENTS

| | | |
|---|---|---|
| CN | 102273089 A | 12/2011 |
| CN | 102545983 A | 7/2012 |
| CN | 102811493 A | 12/2012 |
| CN | 103905104 A | 7/2014 |

OTHER PUBLICATIONS

"On Uplink Pilot in EUTRA SC-FDMA," 3GPP TSG RAN WG1 Ad Hoc on LTE, San Diego, USA, R1-051062, XP050100679, 3rd Generation Partnership Project, Valbonne, France (Oct. 10-14, 2005).

\* cited by examiner

PILOT TRANSMISSION METHOD, STATION AND ACCESS STATION

CROSS REFERENCE TO RELATED APPLICATIONS

This application is a continuation of International Patent Application No. PCT/CN2014/093251, filed on Dec. 8, 2014, the disclosure of which is hereby incorporated by reference in its entirety.

TECHNICAL FIELD

Embodiments of the present invention relate to communications technologies, and in particular, to a pilot transmission method, a station, and an access station.

BACKGROUND

A wireless fidelity (WiFi for short) technology is a main technical standard of a wireless local area network (WLAN for short). The technical standard 802.11 formulated by the Institute of Electrical and Electronics Engineers (IEEE for short) is technically more mature after developing into various versions such as 802.11a, 802.11b, 802.11d, 802.11n, and 802.11ac, and a transmission speed is higher. In another aspect, due to unique flexibility of the WiFi technology, the WiFi technology is increasingly applied in household and commercial environments. In a WiFi-based WLAN network, a receiver performs a baseband processing procedure on a received signal, mainly including: symbol synchronization, channel estimation, data preprocessing, and the like. The symbol synchronization refers to performing symbol synchronization according to a received short training field (STF for short) and the received signal to implement frequency synchronization and time synchronization between a transmitter and a receiver. The channel estimation actually uses a received long training field (LTF for short) to perform channel estimation so as to obtain channel information. The data preprocessing actually refers to performing channel equalization on a signal according to the channel information obtained by means of the channel estimation, so as to eliminate channel impact. Although the receiver may use the STF to implement frequency synchronization between the transmitter and the receiver, due to existence of noise and interference, a residual frequency deviation still exists after a frequency between the receiver and the transmitter undergoes synchronization processing according to the SFT. Although the receiver may eliminate channel impact according to channel equalization in data preprocessing, the residual frequency deviation still exists. The residual frequency deviation may lead to a phase deviation of a received signal, and further lead to increase of a bit error rate of the received signal or even failure in demodulating the received signal.

In the prior art, a pilot may be carried on a pilot subcarrier, and a phase deviation may be estimated according to the pilot, so as to obtain the phase deviation. The receiver performs phase compensation for the channel-equalized data according to the obtained phase deviation to relieve impact caused by noise and interference. In a multiple-input multiple-output (MIMO for short) scenario of uplink multiple users, that is, in a scenario in which there are at least two stations and an access station includes at least two antennas, stations each transmit different pilots to the access station by using their respective antennas. Therefore, a process of obtaining a phase deviation between each station and the access station by the access station is actually a process of solving, according to a received signal on a pilot subcarrier and a pilot, a matrix of multiplying a quantity of data flows of all stations by a quantity of receive antennas of the access station.

However, the larger quantity of uplink data flows transmitted by all stations indicates the more complex process of solving the phase deviation between each station and the access station by the access station.

SUMMARY

Embodiments of the present invention provide a pilot transmission method, a station, and an access station, so as to resolve a problem that phase deviation calculation is relatively complex in the prior art.

According to a first aspect, an embodiment of the present invention provides a pilot transmission method, including:
receiving, by a station, a pilot transmission notification from an access point, where the pilot transmission notification includes a pilot transmission rule of the station and a pilot transmission rule of another station on a group of continuous subcarriers; the pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the another station includes: pilots transmitted on all subcarriers have a same amplitude and a same phase; and
transmitting, by the station, a pilot according to the pilot transmission rule of the station.

According to the first aspect, in a first possible implementation manner of the first aspect, the pilot transmission notification further includes a pilot transmission rule of at least one of other stations on the group of continuous subcarriers, and the pilot transmission rule of each of the other stations includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases.

According to the first aspect, in a second possible implementation manner of the first aspect, in the two subcarrier groups, a quantity of subcarriers in one subcarrier group is equal to a quantity of subcarriers in the other subcarrier group.

According to the first aspect, in a third possible implementation manner of the first aspect, in the two subcarrier groups, a quantity of subcarriers in one subcarrier group is one more than a quantity of subcarriers in the other subcarrier group.

According to the first aspect, in a fourth possible implementation manner of the first aspect, the group of continuous subcarriers includes two continuous subcarriers.

According to a second aspect, an embodiment of the present invention further provides a pilot transmission method, including:
receiving, by a station, a pilot transmission notification from an access point, where the pilot transmission notification includes a pilot transmission rule of the station and a pilot transmission rule of another station on one subcarrier in multiple continuous symbol periods; the pilot transmission rule of the station includes:

the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the another station includes: pilots transmitted on the subcarrier in all symbol periods have a same amplitude and a same phase; and transmitting, by the station, a pilot according to the pilot transmission rule of the station.

According to the second aspect, in a first possible implementation manner of the second aspect, the pilot transmission notification further includes a pilot transmission rule of at least one of other stations on the subcarrier in the multiple continuous symbol periods, and the pilot transmission rule of each of the other stations includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases.

According to the second aspect, in a second possible implementation manner of the second aspect, in the two symbol period groups, a quantity of symbol periods in one symbol period group is equal to a quantity of symbol periods in the other symbol period group.

According to the second aspect, in a third possible implementation manner of the second aspect, in the two symbol period groups, a quantity of symbol periods in one symbol period group is one more than a quantity of symbol periods in the other symbol period group.

According to the second aspect, in a fourth possible implementation manner of the second aspect, the multiple continuous symbol periods include two continuous symbol periods.

According to a third aspect, an embodiment of the present invention further provides a pilot transmission method, including:

receiving, by an access station, access requests from multiple stations, where the multiple stations include a first station and a second station; and returning, by the access station, a pilot transmission notification to the multiple stations, where the pilot transmission notification includes a pilot transmission rule of the first station and a pilot transmission rule of the second station on a group of continuous subcarriers; the pilot transmission rule of the first station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the second station includes: pilots transmitted on all subcarriers have a same amplitude and a same phase.

According to the third aspect, in a first possible implementation manner of the third aspect, the method further includes:

receiving, by the access station on each subcarrier in the group of continuous subcarriers, pilots transmitted by the multiple stations; and calculating, by the access station, a phase deviation of each station in the multiple stations according to the pilots transmitted by the multiple stations and received on each subcarrier in the group of continuous subcarriers.

According to a fourth aspect, an embodiment of the present invention further provides a pilot transmission method, including:

receiving, by an access station, access requests from multiple stations, where the multiple stations include a first station and a second station; and returning, by the access station, a pilot transmission notification to the multiple stations, where the pilot transmission notification includes a pilot transmission rule of the first station and a pilot transmission rule of the second station on one subcarrier in multiple continuous symbol periods; the pilot transmission rule of the first station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the second station includes: pilots transmitted on the subcarrier in all symbol periods have a same amplitude and a same phase.

According to the fourth aspect, in a first possible implementation manner of the fourth aspect, the method further includes:

receiving, by the access station on the subcarrier in the multiple continuous symbol periods, pilots transmitted by the multiple stations; and calculating, by the access station, a phase deviation of each station in the multiple stations according to the pilots transmitted by the multiple stations and received on the subcarrier in the multiple continuous symbol periods.

According to a fifth aspect, an embodiment of the present invention further provides a station, including:

a receiving module, configured to receive a pilot transmission notification from an access point, where the pilot transmission notification includes a pilot transmission rule of the station and a pilot transmission rule of another station on a group of continuous subcarriers; the pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the another station includes: pilots transmitted on all subcarriers have a same amplitude and a same phase; and a transmission module, configured to transmit a pilot according to the pilot transmission rule of the station.

According to a sixth aspect, an embodiment of the present invention further provides a station, including:

a receiving module, configured to receive a pilot transmission notification from an access point, where the pilot transmission notification includes a pilot transmission rule of the station and a pilot transmission rule of another station on one subcarrier in multiple continuous symbol periods; the pilot transmission rule of the station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the another station includes: pilots transmitted on the subcarrier in all symbol periods have a same amplitude and a same phase; and a transmission module, configured to transmit a pilot according to the pilot transmission rule of the station.

According to a seventh aspect, an embodiment of the present invention further provides a station, including a receiver, a processor, and a transmitter, where the receiver is configured to receive a pilot transmission notification from an access point, where the pilot transmission notification includes a pilot transmission rule of the station and a pilot transmission rule of another station on a group of continuous subcarriers; the pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the another station includes: pilots transmitted on all subcarriers have a same amplitude and a same phase; and the transmitter is configured to transmit a pilot according to the pilot transmission rule of the station.

According to an eighth aspect, an embodiment of the present invention further provides a station, including a receiver, a processor, and a transmitter, where the receiver is configured to receive a pilot transmission notification from an access point, where the pilot transmission notification includes a pilot transmission rule of the station and a pilot transmission rule of another station on one subcarrier in multiple continuous symbol periods; the pilot transmission rule of the station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the another station includes: pilots transmitted on the subcarrier in all symbol periods have a same amplitude and a same phase; and the transmitter is configured to transmit, a pilot according to the pilot transmission rule of the station.

According to a ninth aspect, an embodiment of the present invention further provides an access station, including:

a receiving module, configured to receive access requests from multiple stations, where the multiple stations include a first station and a second station; and a transmission module, configured to return a pilot transmission notification to the multiple stations, where the pilot transmission notification includes a pilot transmission rule of the first station and a pilot transmission rule of the second station on a group of continuous subcarriers; the pilot transmission rule of the first station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the second station includes: pilots transmitted on all subcarriers have a same amplitude and a same phase.

According to the ninth aspect, in a first possible implementation manner of the ninth aspect, the receiving module is further configured to receive, on each subcarrier in the group of continuous subcarriers, pilots transmitted by the multiple stations; and the access station further includes:

a calculation module, configured to calculate a phase deviation of each station in the multiple stations according to the pilots transmitted by the multiple stations and received on each subcarrier in the group of continuous subcarriers.

According to a tenth aspect, an embodiment of the present invention further provides an access station, including:

a receiving module, configured to receive access requests from multiple stations, where the multiple stations include a first station and a second station; and a transmission module, configured to return a pilot transmission notification to the multiple stations, where the pilot transmission notification includes a pilot transmission rule of the first station and a pilot transmission rule of the second station on one subcarrier in multiple continuous symbol periods; the pilot transmission rule of the first station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the second station includes: pilots transmitted on the subcarrier in all symbol periods have a same amplitude and a same phase.

According to the tenth aspect, in a first possible implementation manner of the tenth aspect, the receiving module is further configured to receive, on the subcarrier in the multiple continuous symbol periods, pilots transmitted by the multiple stations; and the access station further includes:

a calculation module, configured to calculate a phase deviation of each station in the multiple stations according to the pilots transmitted by the multiple stations and received on the subcarrier in the multiple continuous symbol periods.

According to an eleventh aspect, an embodiment of the present invention further provides an access station, including a receiver, a processor, and a transmitter, where the receiver is configured to receive access requests from multiple stations, where the multiple stations include a first station and a second station; and the transmitter is configured to return a pilot transmission notification to the multiple stations, where the pilot transmission notification includes a pilot transmission rule of the first station and a pilot transmission rule of the second station on a group of continuous subcarriers; the pilot transmission rule of the first station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the second station includes: pilots transmitted on all subcarriers have a same amplitude and a same phase.

According to the eleventh aspect, in a first possible implementation manner of the eleventh aspect, the receiver is further configured to receive, on each subcarrier in the group of continuous subcarriers, pilots transmitted by the multiple stations; and the processor is configured to calculate a phase deviation of each station in the multiple stations according to the pilots transmitted by the multiple stations and received on each subcarrier in the group of continuous subcarriers.

According to a twelfth aspect, an embodiment of the present invention further provides an access station, including a receiver, a processor, and a transmitter, where the receiver is configured to receive access requests from multiple stations, where the multiple stations include a first station and a second station; and the transmitter is configured to return a pilot transmission notification to the multiple stations, where the pilot transmission notification includes a pilot transmission rule of the first station and a pilot transmission rule of the second station on one subcarrier in multiple continuous symbol periods; the pilot transmission rule of the first station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the second station includes: pilots transmitted on the subcarrier in all symbol periods have a same amplitude and a same phase.

According to the twelfth aspect, in a first possible implementation manner of the twelfth aspect, the receiver is further configured to receive, on the subcarrier in the multiple continuous symbol periods, pilots transmitted by the multiple stations; and the processor is configured to calculate a phase deviation of each station in the multiple stations according to the pilots transmitted by the multiple stations and received on the subcarrier in the multiple continuous symbol periods and according to the pilot transmission rule of the first station and the pilot transmission rule of the second station.

According to the pilot transmission method, the station, and the access station in the embodiments of the present invention, a station receives a pilot transmission notification from an access point. The pilot transmission notification includes a pilot transmission rule of the station and a pilot transmission rule of another station on a group of continuous subcarriers. The pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases. The pilot transmission rule of the another station includes: pilots transmitted on all subcarriers have a same amplitude and a same phase. The station transmits a pilot according to the pilot transmission rule of the station. Therefore, after the access point receives the pilot of the station, because a pilot phase is cancelled out, complexity of calculating a phase deviation by the access point may be reduced.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
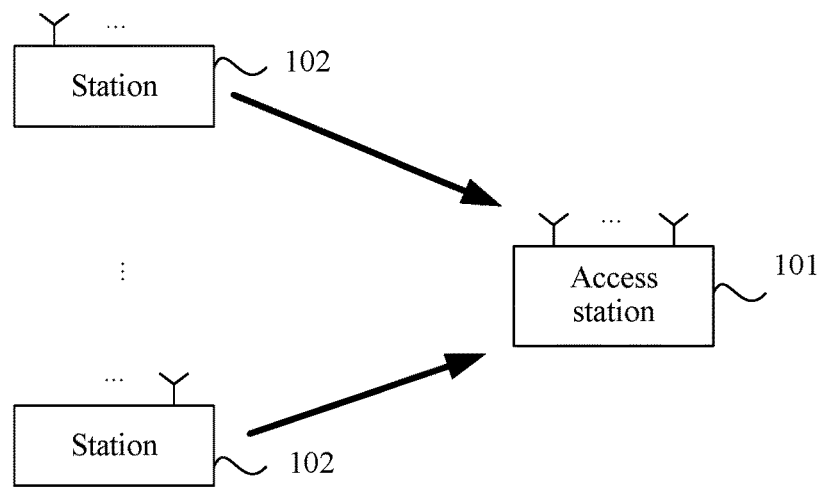
FIG. 1 is a schematic diagram of an applicable scenario of a pilot transmission method according to Embodiment 1 of the present invention.

The solution in this embodiment is applicable to WLAN network systems based on WiFi technologies and MIMO technologies that use the 802.11 version and all other later versions. FIG. 1 is a schematic diagram of an applicable scenario of a pilot transmission method according to Embodiment 1 of the present invention. As shown in FIG. 1, a WLAN network system may include an access station 101 and at least two stations 102. The access station 101 includes at least two receive antennas, and each station may include at least one transmit antenna. The solution in this embodiment is applicable to a scenario in which the access station receives a user data flow by using the at least two receive antennas. The user data flow is transmitted by the at least two stations by using their respective antennas. Each station may correspond to one user equipment transmit antenna.

Figure 2:
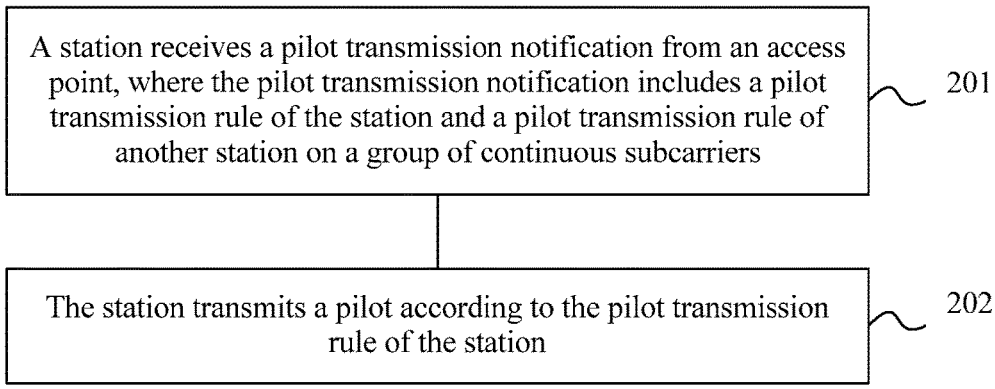
FIG. 2 is a flowchart of a pilot transmission method according to Embodiment 1 of the present invention.

FIG. 2 is a flowchart of a pilot transmission method according to Embodiment 1 of the present invention. The method is executed by a station. As shown in FIG. 2, the method in this embodiment includes the following steps.

Step 201: The station receives a pilot transmission notification from an access point, where the pilot transmission notification includes a pilot transmission rule of the station and a pilot transmission rule of another station on a group of continuous subcarriers.

The pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases. The pilot transmission rule of the another station includes: pilots transmitted on all subcarriers have a same amplitude and a same phase.

Specifically, the station and the another station have different pilot transmission rules. In the pilot transmission rule of the station, only the pilots transmitted on the subcarriers in the same subcarrier group have the same amplitude and the same phase, but the pilots transmitted on the subcarriers in different subcarrier groups have the same amplitude but inverse phases. However, in the pilot transmission rule of the another station, the pilots transmitted on all subcarriers have the same amplitude and the same phase.

The group of continuous subcarriers includes a group of subcarriers with continuous frequency domains. A quantity of subcarriers in the group of continuous subcarriers may be at least two. The quantity of subcarriers in the group of continuous subcarriers may be determined according to a quantity of stations in a current network system or a quantity of data flows transmitted by the station.

Because the method provided in Embodiment 1 of the present invention is a pilot transmission method, the group of continuous subcarriers includes at least one pilot subcarrier. A preset quantity of pilot subcarriers are reserved in each symbol period used to transmit data in the Wi-Fi standard. A symbol period refers to a time domain period corresponding to orthogonal frequency division multiplexing (OFDM for short). For different broadband systems, the quantity of pilot subcarriers differs. For example, for a 20 M broadband system, each symbol period in a frame structure of a prefix required by the station may have 64 subcarriers. Of the 64 subcarriers, 52 subcarriers are actually used, including 48 data subcarriers and 4 pilot subcarriers. Unused subcarriers are filled with zeros. The data subcarriers are used to carry data of data flows, and the pilot subcarriers are used to carry pilots. The pilot subcarrier included in the group of continuous subcarriers may be any one of the foregoing pilot subcarriers. The 64 subcarriers may be numbered in a positive-negative bidirectional encoding manner. For example, for −32 to 31, the 4 pilot subcarriers may be subcarriers numbered −21, −7, 7, and 21. The one pilot subcarrier may be a subcarrier with any serial number in the subcarriers numbered −21, −7, 7, and 21.

It should be noted that the pilot transmission notification may further include a pilot transmission rule of the station and a pilot transmission rule of another station on another group of continuous subcarriers. The another group of continuous subcarriers may include at least one pilot subcarrier that is different from those in the group of continuous subcarriers. The pilot transmission rule of the station and the pilot transmission rule of the another station on the another group of continuous subcarriers may be similar to the pilot transmission rules on the group of continuous subcarriers, and details are not described herein. The quantity of groups of continuous subcarriers may be set according to actual requirements, for example, determined according to preset phase deviation precision.

Step 202: The station transmits a pilot according to the pilot transmission rule of the station.

Specifically, the station transmits the pilot according to the pilot transmission rule of the station. That is, the station transmits pilots with the same amplitude and the same phase on each subcarrier in the same subcarrier group in the group of continuous subcarriers, and transmits pilots with the same amplitude but inverse phases on subcarriers in different subcarrier groups.

After receiving the pilot transmitted by the station according to the pilot transmission rule of the station and pilots transmitted by other stations according to the pilot transmission rule of the other stations, the access point may determine the phase deviation between the station and the access station, and the phase deviation between the another station and the access station according to the following: a received signal used by the access station to receive the pilot transmitted by the station, a received signal used by the another station to receive the pilots transmitted by the other stations, and channel information of the group of continuous subcarriers. It should be noted that the pilot transmitted by the station is also different from the pilots transmitted by the other stations. The group of continuous subcarriers has the same channel information. The "same" channel information mentioned in this embodiment does not mean completely consistent channel information, but means that a channel information difference is in a specific range. The channel information of the group of continuous subcarriers may be obtained by the access point by performing channel estimation according to an LTF. That is, in a process of obtaining the phase deviation, all channel information is known.

In the pilot transmission method provided in Embodiment 1 of the present invention, in the pilot transmission rule of the station, the pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases. The pilot transmission rule of the another station includes: pilots transmitted on all subcarriers have a same amplitude and a same phase. Therefore, in a process of obtaining the phase deviation of the station by the access station, phases may be cancelled out by means of addition for the pilots of the station on the subcarriers in different subcarrier groups, phases may be cancelled out by means of subtraction for the pilots of the station on the subcarriers in the same subcarrier group, and phases may be cancelled out by means of subtraction for the pilots of the another station on all subcarriers, thereby reducing complexity of obtaining the phase deviation by the access point.

According to the pilot transmission method provided in Embodiment 1 of the present invention, complexity of obtaining the phase deviation by the access point can be reduced, and therefore precision of calculating the phase deviation can be improved.

Embodiment 2

This embodiment of the present invention further provides a signal processing method. The pilot transmission notification may further include a pilot transmission rule of at least one of other stations on the group of continuous subcarriers. The pilot transmission rule of each of the other stations includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases.

That is, the at least one of other stations may be a station different from the station and the another station in a current network system. The pilot transmission rule of the at least one of other stations is similar to the pilot transmission rule of the station in Embodiment 1, and details are not described herein.

Optionally, if a quantity of stations in a network system is an even number, in the two subcarrier groups, a quantity of subcarriers in one subcarrier group is equal to a quantity of subcarriers in the other subcarrier group.

For example, if the quantity of stations is 2, in the two subcarrier groups, the quantity of subcarriers in each subcarrier group is 1. That is, the quantity of subcarriers in one subcarrier group is equal to the quantity of subcarriers in the other subcarrier group. If the quantity of stations is 4, in the two subcarrier groups, the quantity of subcarriers in each subcarrier group is 2. That is, the quantity of subcarriers in one subcarrier group is equal to the quantity of subcarriers in the other subcarrier group.

Optionally, if the quantity of stations in the network system is an odd number, in the two subcarrier groups, the quantity of subcarriers in one subcarrier group is one more than the quantity of subcarriers in the other subcarrier group.

For example, if the quantity of stations is 3, in the two subcarrier groups, the quantity of subcarriers in one subcarrier group is 2, and the quantity of subcarriers in the other subcarrier group is 1. That is, the quantity of subcarriers in one subcarrier group is one more than the quantity of subcarriers in the other subcarrier group.

Optionally, the group of continuous subcarriers includes two continuous sub carriers.

If the current network system includes two stations, the group of continuous subcarriers includes two continuous subcarriers. If the current network system includes at least two stations, the subcarriers in the group of continuous subcarriers may be any two continuous subcarriers in the at least two continuous subcarriers. For example, if the current network system includes two stations, the group of continuous subcarriers may be two continuous subcarriers. If the current network system includes three stations, the group of continuous subcarriers may be any two continuous subcarriers in three continuous subcarriers. If the current network system includes four stations, the group of continuous subcarriers may be any two continuous subcarriers in four continuous subcarriers. If the current network system includes eight stations, the group of continuous subcarriers may be any two continuous subcarriers in eight continuous subcarriers.

If the network system includes two stations, the two continuous subcarriers in the group of continuous subcarriers may include subcarriers corresponding to serial numbers −21 and −20, or subcarriers corresponding to serial numbers −22 and −21, or subcarriers corresponding to serial numbers −7 and −6, or subcarriers corresponding to serial numbers −8 and −7, or subcarriers corresponding to serial numbers 7 and 8, or subcarriers corresponding to serial numbers 6 and 7, or subcarriers corresponding to serial numbers 21 and 22, or subcarriers corresponding to serial numbers 20 and 21. The serial number of a subcarrier may change according to different numbering manners.

For example, if the group of continuous subcarriers includes two continuous subcarriers, such as subcarriers numbered −21 and −20, the pilots transmitted by the station and the another station are different, and may be $p_1$ and $p_2$ respectively. The pilot transmission rule of the station and the pilot transmission rule of the another station on the group of continuous subcarriers, which are included in the pilot transmission notification, may be shown in Table 1:

TABLE 1

| Subcarrier serial number | Station | Another station |
|---|---|---|
| −21 | $p_1$ | $p_2$ |
| −20 | $-p_1$ | $p_2$ |

In the table, $-p_1$ and $p_1$ are pilots with a same amplitude but inverse phases.

The group of continuous subcarriers may be subcarriers numbered −7 and −6. On the another group of continuous subcarriers, the pilots of the station and the another station may be different from the pilot on the group of continuous subcarriers, for example, $p_3$ and $p_4$ The pilot transmission rule of the station and the pilot transmission rule of the another station on the another group of continuous subcarriers, which are included in the pilot transmission notification, may be shown in Table 2:

TABLE 2

| Subcarrier serial number | Station | Another station |
|---|---|---|
| −7 | $p_3$ | $p_4$ |
| −6 | $-p_3$ | $p_4$ |

In the table, $-p_3$ and $p_3$ are pilots with a same amplitude but inverse phases.

The group of continuous subcarriers may be subcarriers numbered 7 and 8. On the another group of continuous subcarriers, the pilots of the station and the another station may be $p_5$ and $p_6$ The pilot transmission rule of the station and the pilot transmission rule of the another station on the another group of continuous subcarriers, which are included in the pilot transmission notification, may be shown in Table 3:

TABLE 3

| Subcarrier serial number | Station | Another station |
|---|---|---|
| 7 | $p_5$ | $p_6$ |
| 8 | $-p_5$ | $p_6$ |

In the table, $-p_3$ and $p_3$ are pilots with a same amplitude but inverse phases.

The group of continuous subcarriers may be subcarriers numbered 21 and 22. On the another group of continuous subcarriers, the pilots of the station and the another station may be $p_7$ and $p_8$. The pilot transmission rule of the station and the pilot transmission rule of the another station on the another group of continuous subcarriers, which are included in the pilot transmission notification, may be shown in Table 4:

TABLE 4

| Subcarrier serial number | Station | Another station |
|---|---|---|
| 21 | $p_7$ | $p_8$ |
| 22 | $-p_7$ | $p_8$ |

In the table, $-p_7$ and $p_7$ are pilots with a same amplitude but inverse phases.

It should be noted that if a network system includes at least two stations, subcarriers in the group of continuous subcarriers may be at least two continuous subcarriers.

For example, if the network system includes three stations, the pilot transmission notification may include pilot transmission rules of the three stations on the three continuous subcarriers. The three stations may be described as a first station, a second station, and a third station. A pilot of the first station may be $p_1$, a pilot of the second station may be $p_2$, and a pilot of the third station may be $p_3$. The three continuous subcarriers may be subcarriers numbered i, i+1, and i+2. The pilot transmission rules of the three stations may be shown in Table 5:

TABLE 5

| Subcarrier serial number | First station | Second station | Third station |
|---|---|---|---|
| i | $p_1$ | $p_2$ | $p_3$ |
| i + 1 | $p_1$ | $p_2$ | $-p_3$ |
| i + 2 | $p_1$ | $-p_2$ | $p_3$ |

In the table, $-p_2$ and $p_2$ are pilots with a same amplitude but inverse phases, and $-p_3$ and $p_3$ are pilots with a same amplitude but inverse phases.

If the network system includes four stations, the pilot transmission notification may include pilot transmission rules of the four stations on the three continuous subcarriers. The four stations may be described as a first station, a second station, a third station, and a fourth station. A pilot of the first station may be $p_1$, a pilot of the second station may be $p_2$, a pilot of the third station may be $p_3$, and a pilot of the fourth station may be $p_4$. The four continuous subcarriers may be subcarriers numbered i, i+1, i+2, and i+3. The pilot transmission rules of the four stations may be shown in Table 6:

TABLE 6

| Subcarrier serial number | First station | Second station | Third station | Fourth station |
|---|---|---|---|---|
| i | $p_1$ | $p_2$ | $p_3$ | $p_4$ |
| i + 1 | $p_1$ | $p_2$ | $-p_3$ | $-p_4$ |
| i + 2 | $p_1$ | $-p_2$ | $-p_3$ | $p_4$ |
| i + 3 | $p_1$ | $-p_2$ | $p_3$ | $-p_4$ |

In the table, $-p_2$ and $p_2$ are pilots with a same amplitude but inverse phases, $-p_3$ and $p_3$ are pilots with a same amplitude but inverse phases, and $-p_4$ and $p_4$ are pilots with a same amplitude but inverse phases.

If the network system includes eight stations, the pilot transmission notification may include pilot transmission rules of the eight stations on the eight continuous subcarriers. The eight stations may be described as a first station, a second station, a third station, a fourth station, a fifth station, a sixth station, a seventh station, and an eighth station. A pilot of the first station may be $p_1$, a pilot of the second station may be $p_2$, a pilot of the third station may be $p_3$, a pilot of the fourth station may be $p_4$, a pilot of the fifth station may be $p_5$, a pilot of the sixth station may be $p_6$, a pilot of the seventh station may be $p_7$, and a pilot of the eighth station may be $p_8$. The eight continuous subcarriers may be subcarriers numbered i, i+1, i+2, i+3, i+4, i+5, i+6, and i+7. The pilot transmission rules of the eight stations may be shown in Table 7:

TABLE 7

| Subcarrier serial number | First station | Second station | Third station | Fourth station | Fifth station | Sixth station | Seventh station | Eighth station |
|---|---|---|---|---|---|---|---|---|
| i | $p_1$ | $p_2$ | $p_3$ | $p_4$ | $p_5$ | $p_6$ | $p_7$ | $p_8$ |
| i + 1 | $p_1$ | $p_2$ | $-p_3$ | $-p_4$ | $p_5$ | $p_6$ | $-p_7$ | $-p_8$ |
| i + 2 | $p_1$ | $-p_2$ | $-p_3$ | $p_4$ | $p_5$ | $-p_6$ | $-p_7$ | $p_8$ |
| i + 3 | $p_1$ | $-p_2$ | $p_3$ | $-p_4$ | $p_5$ | $-p_6$ | $p_7$ | $-p_8$ |
| i + 4 | $p_1$ | $p_2$ | $p_3$ | $p_4$ | $-p_5$ | $-p_6$ | $-p_7$ | $-p_8$ |
| i + 5 | $p_1$ | $p_2$ | $-p_3$ | $-p_4$ | $-p_5$ | $-p_6$ | $p_7$ | $p_8$ |
| i + 6 | $p_1$ | $-p_2$ | $-p_3$ | $p_4$ | $-p_5$ | $p_6$ | $p_7$ | $-p_8$ |
| i + 7 | $p_1$ | $-p_2$ | $p_3$ | $-p_4$ | $-p_5$ | $p_6$ | $-p_7$ | $p_8$ |

In the table, $-p_2$ and $p_2$ are pilots with a same amplitude but inverse phases, $-p_3$ and $p_3$ are pilots with a same amplitude but inverse phases, $-p_4$ and $p_4$ are pilots with a same amplitude but inverse phases, $-p_5$ and $p_5$ are pilots with a same amplitude but inverse phases, $-p_6$ and $p_6$ are pilots with a same amplitude but inverse phases, $-p_7$ and $p_7$ are pilots with a same amplitude but inverse phases, and $-p_8$ and $p_8$ are pilots with a same amplitude but inverse phases.

According to the pilot transmission method provided in Embodiment 2 of the present invention, the pilot transmission notification, the two subcarrier groups, and the group of continuous subcarriers are further described in detail, so as to better reduce complexity of obtaining the phase deviation by the access station, and ensure phase deviation precision.

Embodiment 3

Figure 3:
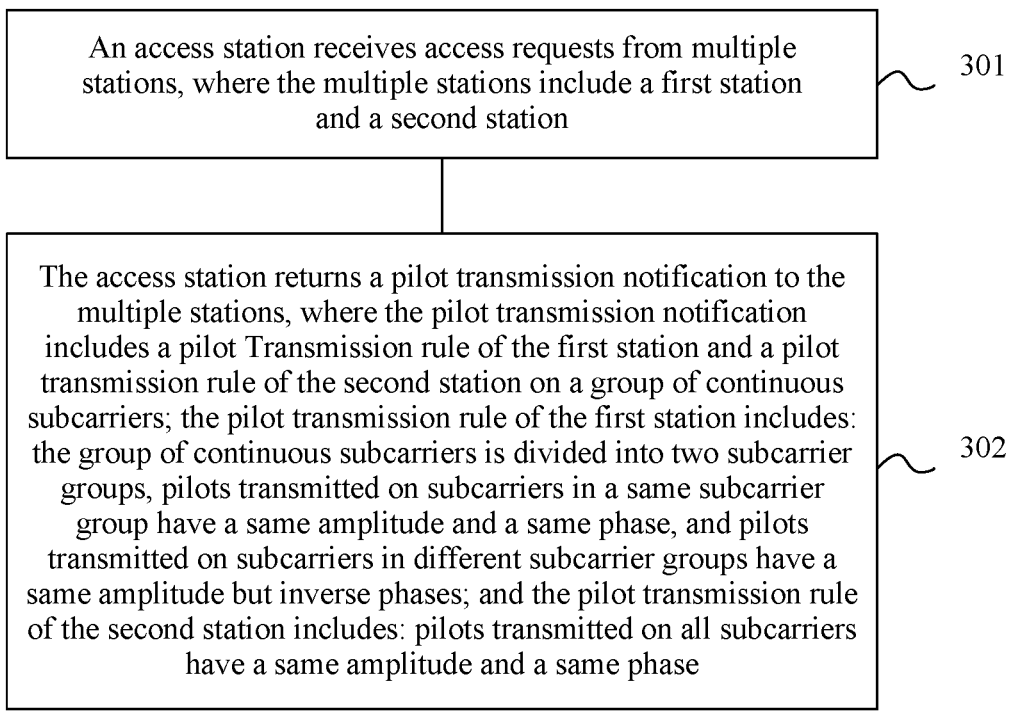
FIG. 3 is a flowchart of a pilot transmission method according to Embodiment 3 of the present invention.

Embodiment 3 of the present invention further provides a pilot transmission method. The method may be executed by an access station. FIG. 3 is a flowchart of the pilot transmission method according to Embodiment 3 of the present invention. As shown in FIG. 3, the method may include the following steps:

Step 301: The access station receives access requests from multiple stations, where the multiple stations include a first station and a second station.

Step 302: The access station returns a pilot transmission notification to the multiple stations, where the pilot transmission notification includes a pilot transmission rule of the first station and a pilot transmission rule of the second station on a group of continuous subcarriers; the pilot transmission rule of the first station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the second station includes: pilots transmitted on all subcarriers have a same amplitude and a same phase.

The pilot transmission method provided in Embodiment 3 of the present invention is a method executed by the access station and corresponding to the pilot transmission method described in Embodiment 1 or 2. A specific implementation process and beneficial effects of the method are similar to those in the foregoing embodiments, and details are not described herein.

Optionally, the method further includes:

the access station receives, on each subcarrier in the group of continuous subcarriers, pilots transmitted by the multiple stations; and the access station calculates a phase deviation of each station in the multiple stations according to the pilots transmitted by the multiple stations and received on each subcarrier in the group of continuous subcarriers.

It should be noted that the pilots transmitted by the multiple stations and received by the access station on each subcarrier in the group of continuous subcarriers are actually hybrid signals received on each subcarrier. The signals received on each subcarrier are related to but different from the pilots transmitted by the multiple stations. The hybrid signals received on each subcarrier may be hybrid signals on each subcarrier after the pilots transmitted by the multiple stations pass through a corresponding channel.

The pilot transmission method provided in Embodiment 3 of the present invention is a method executed by the access station and corresponding to the pilot transmission method described in Embodiment 1 or 2. A specific implementation process and beneficial effects of the method are similar to those in the foregoing embodiments, and details are not described herein.

Embodiment 4

Figure 4:
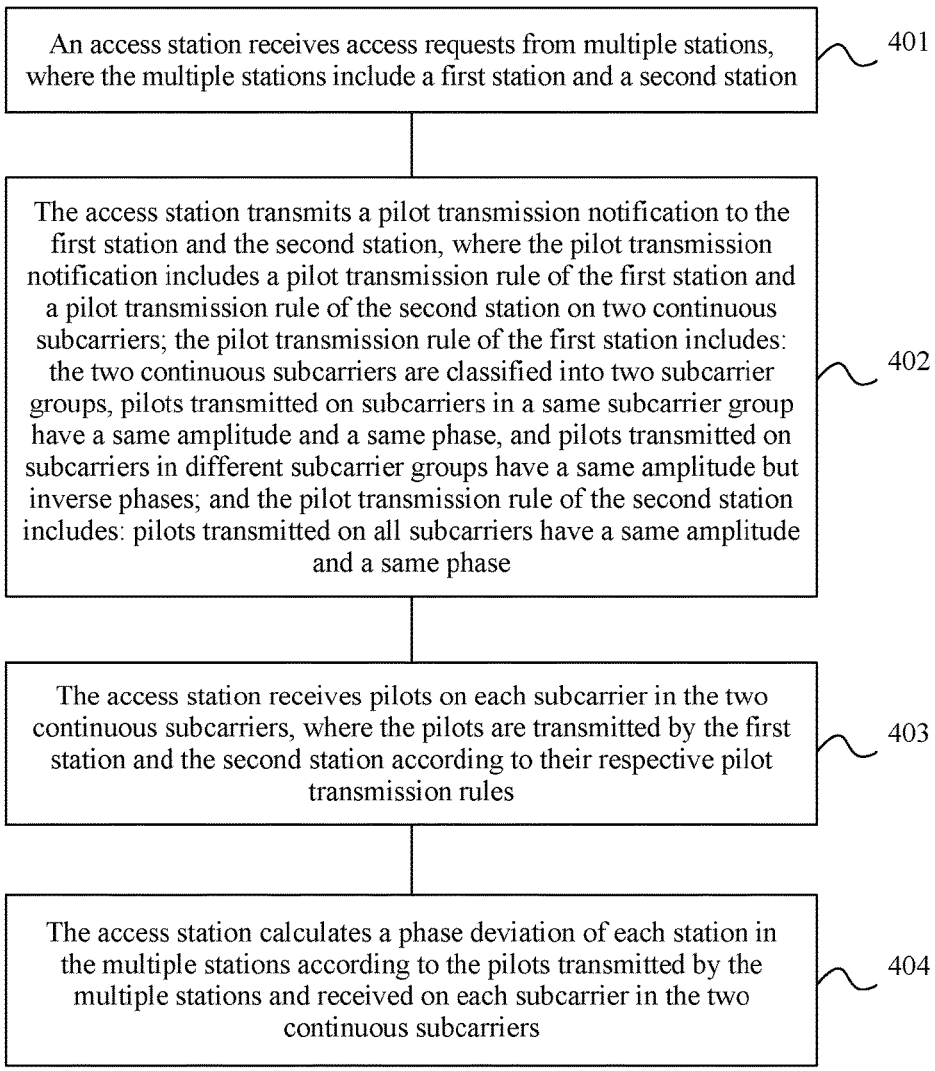
FIG. 4 is a flowchart of a pilot transmission method according to Embodiment 4 of the present invention.

Embodiment 4 of the present invention further provides a pilot transmission method. In Embodiment 4 of the present invention, the method described in any one of Embodiments 1 to 3 is described by using an instance in which a network system includes two stations and one access station. FIG. 4 is a flowchart of the pilot transmission method according to Embodiment 4 of the present invention. As shown in FIG. 4, the method may include the following steps.

Step 401: An access station receives access requests from multiple stations, where the multiple stations include a first station and a second station.

Step 402: The access station transmits a pilot transmission notification to the first station and the second station, where the pilot transmission notification includes a pilot transmission rule of the first station and a pilot transmission rule of the second station on two continuous subcarriers; the pilot transmission rule of the first station includes: the two continuous subcarriers are classified into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the second station includes: pilots transmitted on all subcarriers have a same amplitude and a same phase.

In the two subcarrier groups into which the two continuous subcarriers are classified, each subcarrier group may include one subcarrier. The two continuous subcarriers may be subcarriers numbered i and i+1 respectively. The subcarrier numbered i may be any pilot subcarrier. That is, the pilot transmitted by the first station may be $p_1$. The pilot transmitted by the second station may be $p_2$.

Therefore, the pilot transmission rules of the first station and the second station may be shown in Table 8:

TABLE 8

| Subcarrier serial number | First station | Second station |
|---|---|---|
| i | $p_1$ | $p_2$ |
| i + 1 | $-p_1$ | $p_2$ |

In the table, $-p_1$ and $p_1$ are pilots with a same amplitude but inverse phases.

Step 403: The access station receives pilots on each subcarrier in the two continuous subcarriers, where the pilots are transmitted by the first station and the second station according to their respective pilot transmission rules.

Step 404: The access station calculates a phase deviation of each station in the multiple stations according to the pilots transmitted by the multiple stations and received on each subcarrier in the two continuous subcarriers.

Specifically, the pilots transmitted by the multiple stations and received by the access station on each subcarrier in the two continuous subcarriers are hybrid signals received on each subcarrier in the two continuous subcarriers.

A hybrid signal received by the access station on the subcarrier numbered i may be denoted by $Y_i$, and a hybrid signal received by the access station on the subcarrier numbered i+1 may be denoted by $Y_{i+1}$. If the access station includes two receive antennas, the channel information from the first station to the two receive antennas may be denoted by $h_{11}$ and $h_{21}$, and the channel information from the second station to the two receive antennas may be denoted by $h_{12}$ and $h_{22}$. The phase deviation of the first station may be denoted by $\varphi_1$, and the phase deviation of the second station may be denoted by $\varphi_2$.

$Y_i$ may be denoted by Formula (1), and $Y_{i+1}$ may be denoted by Formula (2).

$$Y_i = \begin{bmatrix} p_1 h_{11}(i) & p_2 h_{12}(i) \\ p_1 h_{21}(i) & p_2 h_{22}(i) \end{bmatrix} \begin{bmatrix} \varphi_1 \\ \varphi_2 \end{bmatrix}; \text{ and} \quad (1)$$

$$Y_{i+1} = \begin{bmatrix} -p_1 h_{11}(i+1) & p_2 h_{12}(i+1) \\ -p_1 h_{21}(i+1) & p_2 h_{22}(i+1) \end{bmatrix} \begin{bmatrix} \varphi_1 \\ \varphi_2 \end{bmatrix}. \quad (2)$$

The access station determines the phase deviation of each station, for example, by calculating $\varphi_1$ and $\varphi_2$ in Formula (1) and Formula (2).

Because the channel information on continuous subcarriers is the same, $h_{11}(i)$ is the same as $h_{11}(i+1)$, $h_{21}(i)$ is the same as $h_{21}(i+1)$, $h_{12}(i)$ is the same as $h_{12}(i+1)$, and $h_{22}(i)$ is the same as $h_{22}(i+1)$ in the foregoing formulas.

In Embodiment 3 of the present invention, in the pilot transmission rule used by the first station, the pilots transmitted on subcarriers in different subcarrier groups have the same amplitude but inverse phases. In the pilot transmission rule used by the second station, the pilots transmitted on different subcarriers have the same amplitude and the same phase. Therefore, some pilots may be cancelled out by performing an addition operation on Formula (1) and Formula (2) or a subtraction operation on Formula (1) and Formula (2), so as to obtain Formula (3) and Formula (4).

$$Y_i + Y_{i+1} = \begin{bmatrix} 2p_2 h_{12}(i) \\ 2p_2 h_{22}(i) \end{bmatrix} \varphi_2; \text{ and} \quad (3)$$

$$Y_i - Y_{i+1} = \begin{bmatrix} 2p_1 h_{11}(i) \\ 2p_1 h_{21}(i) \end{bmatrix} \varphi_1. \quad (4)$$

Because the pilot transmission rules of the first station and the second station in Embodiment 3 of the present invention can perform pilot cancellation, two-variable linear equations shown in Formula (1) and Formula (2) are simplified into two one-variable linear equations shown in Formula (3) and Formula (4), thereby reducing complexity of obtaining the phase deviation by the access station.

Figure 5:
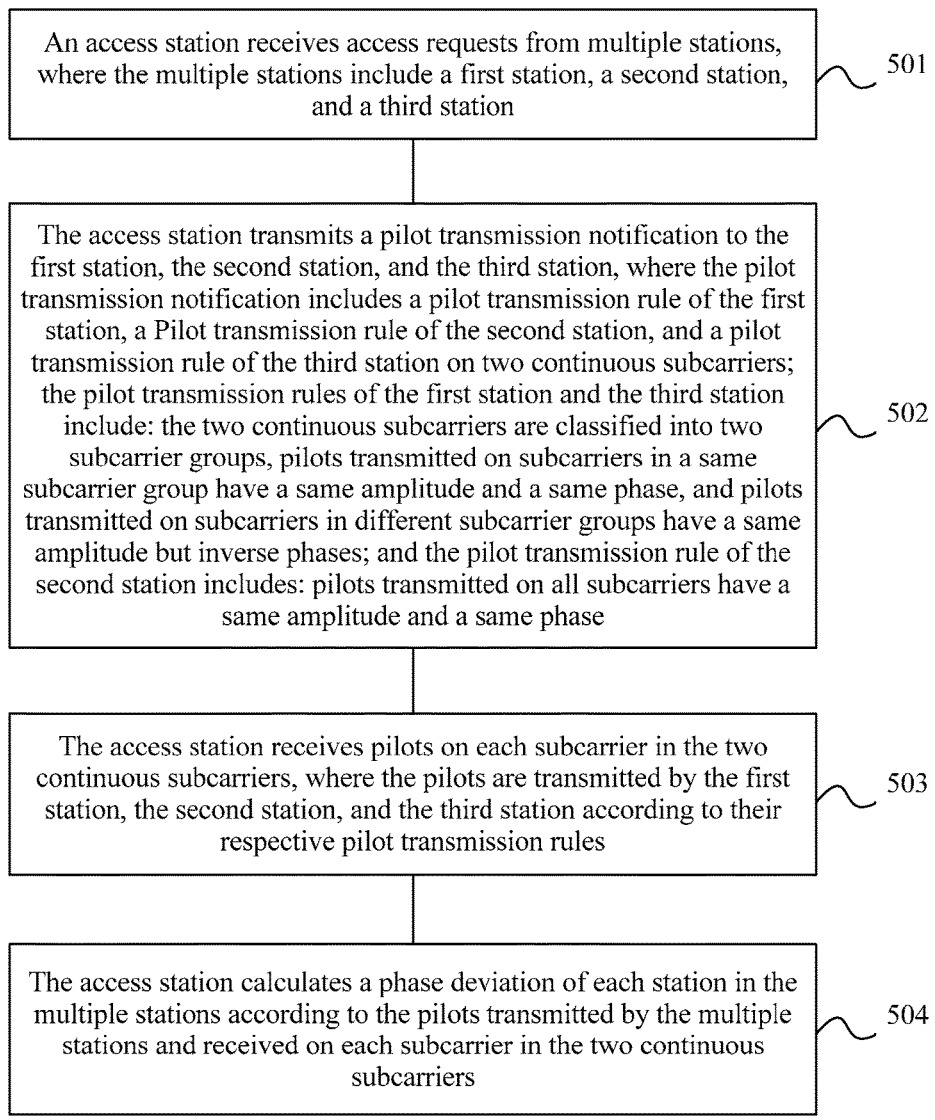
FIG. 5 is a flowchart of another pilot transmission method according to Embodiment 4 of the present invention.

Embodiment 4 of the present invention further provides a pilot transmission method. Specifically, the method described in any one of Embodiments 1 to 3 is described by using an instance in which a network system includes three stations and one access station. FIG. 5 is a flowchart of another pilot transmission method according to Embodiment 4 of the present invention. As shown in FIG. 5, the method may include the following steps.

Step 501: An access station receives access requests from multiple stations, where the multiple stations include a first station, a second station, and a third station.

Step 502: The access station transmits a pilot transmission notification to the first station, the second station, and the third station, where the pilot transmission notification includes a pilot transmission rule of the first station, a pilot transmission rule of the second station, and a pilot transmission rule of the third station on two continuous subcarriers; the pilot transmission rules of the first station and the third station include: the two continuous subcarriers are classified into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the second station includes: pilots transmitted on all subcarriers have a same amplitude and a same phase.

In the two subcarrier groups into which the two continuous subcarriers are classified, each subcarrier group may include one subcarrier. The two continuous subcarriers may be subcarriers numbered i and i+1 respectively. The subcarrier numbered i may be any pilot subcarrier. That is, the pilot transmitted by the first station may be $p_1$, the pilot transmitted by the second station may be $p_2$, and the pilot transmitted by the third station may be $p_3$.

Therefore, the pilot transmission rules of the first station, the second station, and the third station may be shown in Table 9:

TABLE 9

| Subcarrier serial number | First station | Second station | Third station |
| --- | --- | --- | --- |
| i | $p_1$ | $p_2$ | $p_3$ |
| i + 1 | $-p_1$ | $p_2$ | $-p_3$ |

In the table, $-p_1$ and $p_1$ are pilots with a same amplitude but inverse phases. $-p_3$ and $p_3$ are pilots with a same amplitude but inverse phases.

It should be noted that in the pilot transmission rule of each station on two continuous subcarriers, which is included in the pilot transmission notification in step 502, the pilot transmission rule of the first station includes: the two continuous subcarriers are classified into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rules of the second station and the third station include: pilots transmitted on all subcarriers have a same amplitude and a same phase. Correspondingly, the pilot transmission rules of the first station, the second station, and the third station may be shown in Table 10:

TABLE 10

| Subcarrier serial number | First station | Second station | Third station |
| --- | --- | --- | --- |
| i | $p_1$ | $p_2$ | $p_3$ |
| i + 1 | $-p_1$ | $p_2$ | $p_3$ |

In the table, $-p_1$ and $p_1$ are pilots with a same amplitude but inverse phases. In each method provided in Embodiment 4 of the present invention, the two continuous subcarriers may be subcarriers numbered i+1 and i+2, and the subcarrier numbered i is any pilot subcarrier.

If the pilot transmission rules of the first station, the second station, and the third station are shown in Table 10, a specific implementation process is similar to the foregoing process, and may be obtained by simply making adaptive adjustment. In addition, a specific implementation process of two subcarriers numbered i+1 and i+2 is similar to the implementation process of subcarriers numbered i and i+1, and details are not described herein.

Step 503: The access station receives pilots on each subcarrier in the two continuous subcarriers, where the pilots are transmitted by the first station, the second station, and the third station according to their respective pilot transmission rules.

Step 504: The access station calculates a phase deviation of each station in the multiple stations according to the pilots transmitted by the multiple stations and received on each subcarrier in the two continuous subcarriers.

Specifically, the pilots transmitted by the multiple stations and received by the access station on each subcarrier in the two continuous subcarriers are hybrid signals received on each subcarrier in the two continuous subcarriers.

A hybrid signal received by the access station on the subcarrier numbered i may be denoted by $Y_i$, and a hybrid signal received by the access station on the subcarrier numbered i+1 may be denoted by $Y_{i+1}$. If the access station includes three receive antennas, the channel information from the first station to the three receive antennas may be denoted by $h_{11}$, $h_{21}$, and $h_{31}$, the channel information from the second station to the three receive antennas may be denoted by $h_{12}$, $h_{22}$, and $h_{32}$, the phase deviation of the first station may be denoted by $\varphi_1$, the phase deviation of the second station may be denoted by $\varphi_2$, and the phase deviation of the third station may be denoted by $\varphi_3$.

$Y_i$ may be denoted by Formula (5), and $Y_{i+1}$ may be denoted by Formula (6).

$$Y_i = \begin{bmatrix} p_1 h_{11}(i) & p_2 h_{12}(i) & p_3 h_{13}(i) \\ p_1 h_{21}(i) & p_2 h_{22}(i) & p_3 h_{23}(i) \\ p_1 h_{31}(i) & p_2 h_{32}(i) & p_3 h_{33}(i) \end{bmatrix} \begin{bmatrix} \varphi_1 \\ \varphi_2 \\ \varphi_{32} \end{bmatrix}; \text{ and} \quad (5)$$

$$Y_{i+1} = \begin{bmatrix} -p_1 h_{11}(i+1) & p_2 h_{12}(i+1) & -p_3 h_{13}(i+1) \\ -p_1 h_{21}(i+1) & p_2 h_{22}(i+1) & -p_3 h_{23}(i+1) \\ -p_1 h_{31}(i+1) & p_2 h_{32}(i+1) & -p_3 h_{33}(i+1) \end{bmatrix} \begin{bmatrix} \varphi_1 \\ \varphi_2 \\ \varphi_3 \end{bmatrix}. \quad (6)$$

The access station determines the phase deviation of each station, for example, by calculating $\varphi_1$, $\varphi_2$, and $\varphi_3$ in Formula (5) and Formula (6).

Because the channel information on continuous subcarriers is the same, $h_{11}(i)$ is the same as $h_{11}(i+1)$, $h_{21}(i)$ is the same as $h_{21}(i+1)$, $h_{31}(i)$ is the same as $h_{31}(i+1)$, $h_{12}(i)$ is the same as $h_{12}(i+1)$, $h_{22}(i)$ is the same as $h_{22}(i+1)$, $h_{32}(i)$ is the same as $h_{32}(i+1)$, $h_{13}(i)$ is the same as $h_{13}(i+1)$, $h_{23}(i)$ is the same as $h_{23}(i+1)$, and $h_{33}(i)$ is the same as $h_{33}(i+1)$.

In Embodiment 3 of the present invention, in the pilot transmission rules of the first station and the third station, the pilots transmitted on subcarriers in different subcarrier groups have the same amplitude but inverse phases; and in the pilot transmission rule used by the second station, the pilots transmitted on different subcarriers have the same amplitude and the same phase. Therefore, some pilots may be cancelled out by performing an addition operation on Formula (5) and Formula (6) or a subtraction operation on Formula (5) and Formula (6), so as to obtain Formula (7) and Formula (8).

$$Y_i + Y_{i+1} = \begin{bmatrix} 2p_2 h_{12}(i) \\ 2p_2 h_{22}(i) \\ 2p_2 h_{32}(i) \end{bmatrix} \varphi_2; \text{ and} \quad (7)$$

$$Y_i - Y_{i+1} = \begin{bmatrix} 2p_1 h_{11}(i) & 2p_3 h_{13}(i) \\ 2p_1 h_{21}(i) & 2p_3 h_{23}(i) \\ 2p_1 h_{31}(i) & 2p_3 h_{33}(i) \end{bmatrix} \begin{bmatrix} \varphi_1 \\ \varphi_3 \end{bmatrix}. \quad (8)$$

Because the pilot transmission rules of all stations in Embodiment 3 of the present invention can perform pilot cancellation, three-variable linear equations shown in Formula (5) and Formula (6) are simplified into one one-variable linear equation and one two-variable linear equation shown in Formula (7) and Formula (8), thereby reducing complexity of obtaining the phase deviation by the access station.

It should be noted that, according to the pilot transmission method provided in Embodiment 4 of the present invention, complexity of calculating the phase deviation of stations in 4-station, 8-station and more-station scenarios may also be reduced. A specific implementation process is similar to that in Embodiment 4 of the present invention, and details are not described herein.

For example, if the network system includes four stations: a first station, a second station, a third station, and a fourth station, pilots of the four stations may be $p_1$, $p_2$, $p_3$, and $p_4$ respectively.

The group of continuous subcarriers may be subcarriers numbered i and i+1, and the subcarrier numbered i is any pilot subcarrier. Therefore, in the pilot transmission notification transmitted by the access station to the four stations, pilot transmission rules of the first station, the second station, the third station, and the fourth station may be shown in Table 11:

TABLE 11

| Subcarrier serial number | First station | Second station | Third station | Fourth station |
|---|---|---|---|---|
| i | $p_1$ | $p_2$ | $p_3$ | $p_4$ |
| i + 1 | $p_1$ | $p_2$ | $-p_3$ | $-p_4$ |

In the table, $-p_3$ and $p_3$ are pilots with a same amplitude but inverse phases, and $-p_4$ and $p_4$ are pilots with a same amplitude but inverse phases.

If the group of continuous subcarriers may be subcarriers numbered i+1 and i+2, the pilot transmission rules of the first station, the second station, the third station, and the fourth station may be shown in Table 12:

TABLE 12

| Subcarrier serial number | First station | Second station | Third station | Fourth station |
|---|---|---|---|---|
| i + 1 | $p_1$ | $p_2$ | $-p_3$ | $-p_4$ |
| i + 2 | $p_1$ | $-p_2$ | $-p_3$ | $p_4$ |

In the table, $-p_2$ and $p_2$ are pilots with a same amplitude but inverse phases, and $-p_4$ and $p_4$ are pilots with a same amplitude but inverse phases.

If the group of continuous subcarriers may be subcarriers numbered i+2 and i+3, the pilot transmission rules of the first station, the second station, the third station, and the fourth station may be shown in Table 13:

TABLE 13

| Subcarrier serial number | First station | Second station | Third station | Fourth station |
|---|---|---|---|---|
| i + 2 | $p_1$ | $-p_2$ | $-p_3$ | $p_4$ |
| i + 3 | $p_1$ | $-p_2$ | $p_3$ | $-p_4$ |

In the table, $-p_3$ and $p_3$ are pilots with a same amplitude but inverse phases, and $-p_4$ and $p_4$ are pilots with a same amplitude but inverse phases.

If the network system includes eight stations: a first station, a second station, a third station, a fourth station, a fifth station, a sixth station, a seventh station, and an eighth station, pilots of the eight stations may be $p_1$, $p_2$, $p_3$, $p_4$, $p_5$, $p_6$, $p_7$, and $p_8$ respectively.

The group of continuous subcarriers may be subcarriers numbered i and i+1, and the subcarrier numbered i is any pilot subcarrier. The pilot transmission rules of the first station, the second station, the third station, the fourth station, the fifth station, the sixth station, the seventh station, and the eighth station may be shown in Table 14:

TABLE 14

| Subcarrier serial number | First station | Second station | Third station | Fourth station | Fifth station | Sixth station | Seventh station | Eighth station |
|---|---|---|---|---|---|---|---|---|
| i | $p_1$ | $p_2$ | $p_3$ | $p_4$ | $p_5$ | $p_6$ | $p_7$ | $p_8$ |
| i + 1 | $p_1$ | $p_2$ | $-p_3$ | $-p_4$ | $p_5$ | $p_6$ | $-p_7$ | $-p_8$ |

In the table, $-p_3$ and $p_3$ are pilots with a same amplitude but inverse phases, $-p_4$ and $p_4$ are pilots with a same amplitude but inverse phases, $-p_7$ and $p_7$ are pilots with a same amplitude but inverse phases, and $-p_8$ and $p_8$ are pilots with a same amplitude but inverse phases.

If the group of continuous subcarriers may be subcarriers numbered i+1 and i+2, the pilot transmission rules of the first station, the second station, the third station, the fourth station, the fifth station, the sixth station, the seventh station, and the eighth station may be shown in Table 15:

TABLE 15

| Subcarrier serial number | First station | Second station | Third station | Fourth station | Fifth station | Sixth station | Seventh station | Eighth station |
|---|---|---|---|---|---|---|---|---|
| i + 1 | $p_1$ | $p_2$ | $-p_3$ | $-p_4$ | $p_5$ | $p_6$ | $-p_7$ | $-p_8$ |
| i + 2 | $p_1$ | $-p_2$ | $-p_3$ | $p_4$ | $p_5$ | $-p_6$ | $-p_7$ | $p_8$ |

In the table, $-p_2$ and $p_2$ are pilots with a same amplitude but inverse phases, $-p_4$ and $p_4$ are pilots with a same amplitude but inverse phases, $-p_6$ and $p_6$ are pilots with a same amplitude but inverse phases, $-p_8$ and $p_8$ are pilots with a same amplitude but inverse phases.

If the group of continuous subcarriers may be subcarriers numbered i+2 and i+3, the pilot transmission rules of the first station, the second station, the third station, the fourth station, the fifth station, the sixth station, the seventh station, and the eighth station may be shown in Table 16:

TABLE 16

| Subcarrier serial number | First station | Second station | Third station | Fourth station | Fifth station | Sixth station | Seventh station | Eighth station |
|---|---|---|---|---|---|---|---|---|
| i + 2 | $p_1$ | $-p_2$ | $-p_3$ | $p_4$ | $p_5$ | $-p_6$ | $-p_7$ | $p_8$ |
| i + 3 | $p_1$ | $-p_2$ | $p_3$ | $-p_4$ | $p_5$ | $-p_6$ | $p_7$ | $-p_8$ |

In the table, $-p_3$ and $p_3$ are pilots with a same amplitude but inverse phases, $-p_4$ and $p_4$ are pilots with a same amplitude but inverse phases, $-p_7$ and $p_7$ are pilots with a same amplitude but inverse phases, and $-p_8$ and $p_8$ are pilots with a same amplitude but inverse phases.

If the group of continuous subcarriers may be subcarriers numbered i+3 and i+4, the pilot transmission rules of the first station, the second station, the third station, the fourth station, the fifth station, the sixth station, the seventh station, and the eighth station may be shown in Table 17:

TABLE 17

| Subcarrier serial number | First station | Second station | Third station | Fourth station | Fifth station | Sixth station | Seventh station | Eighth station |
|---|---|---|---|---|---|---|---|---|
| i + 3 | $p_1$ | $-p_2$ | $p_3$ | $-p_4$ | $p_5$ | $-p_6$ | $p_7$ | $-p_8$ |
| i + 4 | $p_1$ | $p_2$ | $p_3$ | $p_4$ | $-p_5$ | $-p_6$ | $-p_7$ | $-p_8$ |

In the table, $-p_2$ and $p_2$ are pilots with a same amplitude but inverse phases, $-p_4$ and $p_4$ are pilots with a same amplitude but inverse phases, $-p_5$ and $p_5$ are pilots with a same amplitude but inverse phases, and $-p_7$ and $p_7$ are pilots with a same amplitude but inverse phases.

If the group of continuous subcarriers may be subcarriers numbered i+4 and i+5, the pilot transmission rules of the first station, the second station, the third station, the fourth station, the fifth station, the sixth station, the seventh station, and the eighth station may be shown in Table 18:

TABLE 18

| Subcarrier serial number | First station | Second station | Third station | Fourth station | Fifth station | Sixth station | Seventh station | Eighth station |
|---|---|---|---|---|---|---|---|---|
| i + 4 | $p_1$ | $p_2$ | $p_3$ | $p_4$ | $-p_5$ | $-p_6$ | $-p_7$ | $-p_8$ |
| i + 5 | $p_1$ | $p_2$ | $-p_3$ | $-p_4$ | $-p_5$ | $-p_6$ | $p_7$ | $p_8$ |

In the table, $-p_3$ and $p_3$ are pilots with a same amplitude but inverse phases, $-p_4$ and $p_4$ are pilots with a same amplitude but inverse phases, $-p_7$ and $p_7$ are pilots with a same amplitude but inverse phases, and $-p_8$ and $p_8$ are pilots with a same amplitude but inverse phases.

If the group of continuous subcarriers may be subcarriers numbered i+5 and i+6, the pilot transmission rules of the first station, the second station, the third station, the fourth station, the fifth station, the sixth station, the seventh station, and the eighth station may be shown in Table 19:

TABLE 19

| Subcarrier serial number | First station | Second station | Third station | Fourth station | Fifth station | Sixth station | Seventh station | Eighth station |
|---|---|---|---|---|---|---|---|---|
| i + 5 | $p_1$ | $p_2$ | $-p_3$ | $-p_4$ | $-p_5$ | $-p_6$ | $p_7$ | $p_8$ |
| i + 6 | $p_1$ | $-p_2$ | $-p_3$ | $p_4$ | $-p_5$ | $p_6$ | $p_7$ | $-p_8$ |

In the table, $-p_2$ and $p_2$ are pilots with a same amplitude but inverse phases, $-p_4$ and $p_4$ are pilots with a same amplitude but inverse phases, $-p_6$ and $p_6$ are pilots with a same amplitude but inverse phases, $-p_8$ and $p_8$ are pilots with a same amplitude but inverse phases.

If the group of continuous subcarriers may be subcarriers numbered i+6 and i+7, the pilot transmission rules of the first station, the second station, the third station, the fourth station, the fifth station, the sixth station, the seventh station, and the eighth station may be shown in Table 20:

TABLE 20

| Subcarrier serial number | First station | Second station | Third station | Fourth station | Fifth station | Sixth station | Seventh station | Eighth station |
|---|---|---|---|---|---|---|---|---|
| i + 6 | $p_1$ | $-p_2$ | $-p_3$ | $p_4$ | $-p_5$ | $p_6$ | $p_7$ | $-p_8$ |
| i + 7 | $p_1$ | $-p_2$ | $p_3$ | $-p_4$ | $-p_5$ | $p_6$ | $-p_7$ | $p_8$ |

In the table, $-p_3$ and $p_3$ are pilots with a same amplitude but inverse phases, $-p_4$ and $p_4$ are pilots with a same amplitude but inverse phases, $-p_7$ and $p_7$ are pilots with a same amplitude but inverse phases, and $-p_8$ and $p_8$ are pilots with a same amplitude but inverse phases.

If the pilot transmission rules of all the stations are shown in Table 11 to Table 20, a specific implementation process is similar to the foregoing process, and may be obtained by simply making adaptive adjustment. The specific implementation process is similar to the process of calculating the phase deviation of three stations in Embodiment 4 of the present invention, and details are not described herein.

Embodiment 5

Figure 6:
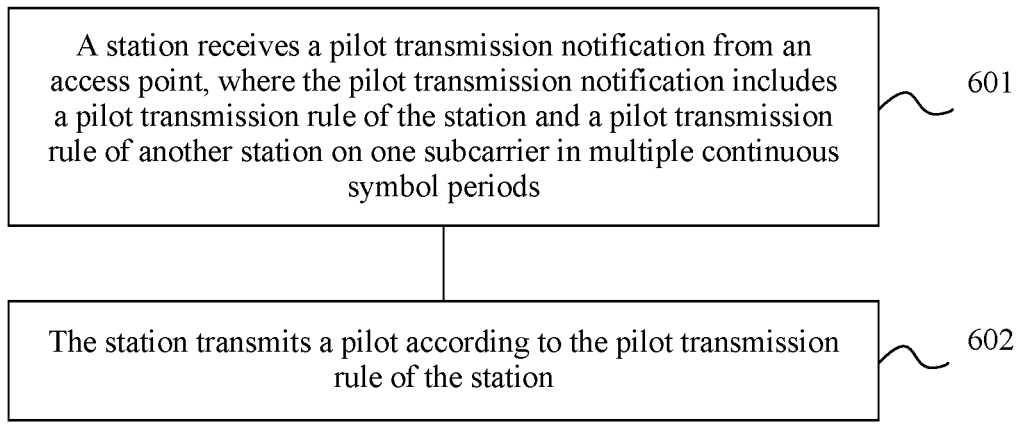
FIG. 6 is a flowchart of a pilot transmission method according to Embodiment 5 of the present invention.

Embodiment 5 of the present invention further provides a pilot transmission method. FIG. 6 is a flowchart of the pilot transmission method according to Embodiment 5 of the present invention. As shown in FIG. 6, the method may include the following steps.

Step 601: A station receives a pilot transmission notification from an access point, where the pilot transmission notification includes a pilot transmission rule of the station and a pilot transmission rule of another station on one subcarrier in multiple continuous symbol periods.

The pilot transmission rule of the station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases. The pilot transmission rule of the another station includes: pilots transmitted on the subcarrier in all symbol periods have a same amplitude and a same phase.

Specifically, the station and the another station have different pilot transmission rules. In the pilot transmission rule of the station, only the pilots transmitted on the subcarrier in symbol periods in the same symbol period group have the same amplitude and the same phase, but the pilots transmitted on the subcarrier in symbol periods in different symbol period groups have the same amplitude but inverse phases. However, in the pilot transmission rule of the another station, the pilots transmitted on the subcarrier in all symbol periods have the same amplitude and the same phase.

The multiple continuous symbol periods may denote different time domain resource locations of the one subcarrier respectively. A quantity of symbol periods in the multiple continuous symbol periods may be at least two, and the symbol periods in the multiple continuous symbol periods may be determined according to a quantity of stations in a current network system or a quantity of data flows transmitted by the station.

In the multiple continuous symbol periods, each symbol period is a time domain period corresponding to one OFDM symbol. In the multiple continuous symbol periods, each symbol period is denoted by one OFDM symbol. According to the Long Term Evolution (LTE for short) R8, R9, or R10 (LTE Release 8/9/10) standard published by the 3rd Generation Partnership Project (3GPP for short), one subframe includes two timeslots, and each timeslot has seven or six OFDM symbols. If each timeslot includes seven OFDM symbols, the multiple continuous symbol periods may be at least two continuous symbol periods in the seven OFDM symbols in each timeslot. The one pilot subcarrier may be a subcarrier with any serial number in the subcarriers numbered −21, −7, 7, and 21.

Step 602: The station transmits a pilot according to the pilot transmission rule of the station.

Specifically, the station transmits the pilot according to the pilot transmission rule of the station. That is, the station transmits pilots with the same amplitude and the same phase on the subcarrier in symbol periods in the same symbol period group within the multiple continuous symbol periods, and transmits pilots with the same amplitude but inverse phases on the subcarrier in symbol periods in different symbol period groups.

According to the pilot transmission method provided in Embodiment 5 of the present invention, in the pilot transmission rule of the station, the pilot transmission rule of the station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases. The pilot transmission rule of the another station includes: pilots transmitted on the subcarrier in all symbol periods have a same amplitude and a same phase. Therefore, in a process of obtaining the phase deviation of the station by the access station, phases may be cancelled out by means of addition for the pilots of the station on the subcarrier in symbol periods in different symbol period groups, phases may be cancelled out by means of subtraction for the pilots of the station on the subcarrier in symbol periods in the same symbol period group, and phases may be cancelled out by means of subtraction for the pilots of the another station on all subcarriers, thereby reducing complexity of obtaining the phase deviation by the access point.

Optionally, the pilot transmission notification further includes a pilot transmission rule of at least one of other stations on the subcarrier in the multiple continuous symbol periods. The pilot transmission rule of each of the other stations includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases.

Optionally, in the two symbol period groups, a quantity of symbol periods in one symbol period group is equal to a quantity of symbol periods in the other symbol period group.

Optionally, in the two symbol period groups, a quantity of symbol periods in one symbol period group is one more than a quantity of symbol periods in the other symbol period group.

Optionally, the multiple continuous symbol periods include two continuous symbol periods.

For example, if the multiple continuous symbol periods include two continuous symbol periods, such as symbol periods numbered k and k+1, the subcarrier in the multiple continuous symbol periods may be a subcarrier numbered −21, and the pilots transmitted by the station and the another station are different, and may be $p_1$ and $p_2$ respectively. The pilot transmission rule of the station and the pilot transmission rule of the another station on the subcarrier in the multiple continuous symbol periods, which are included in the pilot transmission notification, may be shown in Table 21:

TABLE 21

| Symbol period | Subcarrier serial number | Station | Another station |
|---|---|---|---|
| k | −21 | $p_1$ | $p_2$ |
| k + 1 | −21 | $-p_1$ | $p_2$ |

In the table, $-p_1$ and $p_1$ are pilots with a same amplitude but inverse phases.

In the multiple continuous symbol periods, the subcarrier may be a subcarrier numbered −7. On the another group of continuous subcarriers, the pilots of the station and the another station may be different from the pilot on the group of continuous subcarriers, for example, $p_3$ and $p_4$. The pilot transmission rule of the station and the pilot transmission rule of the another station on the another group of continuous subcarriers, which are included in the pilot transmission notification, may be shown in Table 22:

TABLE 22

| Symbol period | Subcarrier serial number | Station | Another station |
|---|---|---|---|
| k | −7 | $p_3$ | $p_4$ |
| k + 1 | −7 | $-p_3$ | $p_4$ |

In the table, $-p_3$ and $p_3$ are pilots with a same amplitude but inverse phases.

In the multiple continuous symbol periods, the subcarrier may be a subcarrier numbered 7. On the another group of continuous subcarriers, the pilots of the station and the another station may be $p_5$ and $p_6$. The pilot transmission rule of the station and the pilot transmission rule of the another station on the another group of continuous subcarriers, which are included in the pilot transmission notification, may be shown in Table 23:

TABLE 23

| Symbol period | Subcarrier serial number | Station | Another station |
|---|---|---|---|
| k | 7 | $p_5$ | $p_6$ |
| k + 1 | 7 | $-p_5$ | $p_6$ |

In the table, $-p_3$ and $p_3$ are pilots with a same amplitude but inverse phases.

In the multiple continuous symbol periods, the subcarrier may be a subcarrier numbered 21. On the another group of continuous subcarriers, the pilots of the station and the another station may be $p_7$ and $p_8$. The pilot transmission rule of the station and the pilot transmission rule of the another station on the another group of continuous subcarriers, which are included in the pilot transmission notification, may be shown in Table 24:

TABLE 24

| Symbol period | Subcarrier serial number | Station | Another station |
|---|---|---|---|
| k | 21 | $p_7$ | $p_8$ |
| k + 1 | 21 | $-p_7$ | $p_8$ |

In the table, $-p_7$ and $p_7$ are pilots with a same amplitude but inverse phases.

It should be noted that if a network system includes at least two stations, the multiple continuous symbol periods may be at least two continuous symbol periods.

For example, if the network system includes three stations, the pilot transmission notification may include pilot transmission rules of the three stations on the subcarrier in the three continuous symbol periods. The three stations may be described as a first station, a second station, and a third station. A pilot of the first station may be $p_1$, a pilot of the second station may be $p_2$, and a pilot of the third station may be $p_3$. The three continuous symbol periods may be symbol periods numbered k, k+1, and k+2. The subcarrier may be a subcarrier numbered i. The pilot transmission rules of the three stations may be shown in Table 25:

TABLE 25

| Symbol period | Subcarrier serial number | First station | Second station | Third station |
|---|---|---|---|---|
| k | i | $p_1$ | $p_2$ | $p_3$ |
| k + 1 | i | $p_1$ | $p_2$ | $-p_3$ |
| k + 2 | i | $p_1$ | $-p_2$ | $p_3$ |

In the table, $-p_2$ and $p_2$ are pilots with a same amplitude but inverse phases, and $-p_3$ and $p_3$ are pilots with a same amplitude but inverse phases.

If the network system includes four stations, the pilot transmission notification may include pilot transmission rules of the four stations on the subcarrier in the four continuous symbol periods. The four stations may be described as a first station, a second station, a third station, and a fourth station. A pilot of the first station may be $p_1$, a pilot of the second station may be $p_2$, a pilot of the third station may be $p_3$, and a pilot of the fourth station may be $p_4$. The four continuous symbol periods may be symbol periods numbered k, k+1, k+2, and k+3. The subcarrier may be a subcarrier numbered i. The pilot transmission rules of the four stations may be shown in Table 26:

TABLE 26

| Symbol period | Subcarrier serial number | First station | Second station | Third station | Fourth station |
|---|---|---|---|---|---|
| k | i | $p_1$ | $p_2$ | $p_3$ | $p_4$ |
| k + 1 | i | $p_1$ | $p_2$ | $-p_3$ | $-p_4$ |
| k + 2 | i | $p_1$ | $-p_2$ | $-p_3$ | $p_4$ |
| k + 3 | i | $p_1$ | $-p_2$ | $p_3$ | $-p_4$ |

In the table, $-p_2$ and $p_2$ are pilots with a same amplitude but inverse phases, $-p_3$ and $p_3$ are pilots with a same amplitude but inverse phases, and $-p_4$ and $p_4$ are pilots with a same amplitude but inverse phases.

If the network system includes eight stations, the pilot transmission notification may include pilot transmission rules of the eight stations on the subcarrier in the eight continuous symbol periods. The eight stations may be described as a first station, a second station, a third station, a fourth station, a fifth station, a sixth station, a seventh station, and an eighth station. A pilot of the first station may be $p_1$, a pilot of the second station may be $p_2$, a pilot of the third station may be $p_3$, a pilot of the fourth station may be $p_4$, a pilot of the fifth station may be $p_5$, a pilot of the sixth station may be $p_6$, a pilot of the seventh station may be $p_7$, and a pilot of the eighth station may be $p_8$. The eight continuous symbol periods may be symbol periods numbered k, k+1, k+2, k+3, k+4, k+5, k+6, and k+7. The subcarrier may be a subcarrier numbered i. The pilot transmission rules of the eight stations may be shown in Table 27:

TABLE 27

| Symbol period | Subcarrier serial number | First station | Second station | Third station | Fourth station | Fifth station | Sixth station | Seventh station | Eighth station |
|---|---|---|---|---|---|---|---|---|---|
| k | i | $p_1$ | $p_2$ | $p_3$ | $p_4$ | $p_5$ | $p_6$ | $p_7$ | $p_8$ |
| i + 1 | k | $p_1$ | $p_2$ | $-p_3$ | $-p_4$ | $p_5$ | $p_6$ | $-p_7$ | $-p_8$ |
| i + 2 | k | $p_1$ | $-p_2$ | $-p_3$ | $p_4$ | $p_5$ | $-p_6$ | $-p_7$ | $p_8$ |
| i + 3 | k | $p_1$ | $-p_2$ | $p_3$ | $-p_4$ | $p_5$ | $-p_6$ | $p_7$ | $-p_8$ |
| i + 4 | k | $p_1$ | $p_2$ | $p_3$ | $p_4$ | $-p_5$ | $-p_6$ | $-p_7$ | $-p_8$ |
| i + 5 | k | $p_1$ | $p_2$ | $-p_3$ | $-p_4$ | $-p_5$ | $-p_6$ | $p_7$ | $p_8$ |
| i + 6 | k | $p_1$ | $-p_2$ | $-p_3$ | $p_4$ | $-p_5$ | $p_6$ | $p_7$ | $-p_8$ |
| i + 7 | k | $p_1$ | $-p_2$ | $p_3$ | $-p_4$ | $-p_5$ | $p_6$ | $-p_7$ | $p_8$ |

In the table, $-p_2$ and $p_2$ are pilots with a same amplitude but inverse phases, $-p_3$ and $p_3$ are pilots with a same amplitude but inverse phases, $-p_4$ and $p_4$ are pilots with a same amplitude but inverse phases, $-p_5$ and $p_5$ are pilots with a same amplitude but inverse phases, $-p_6$ and $p_6$ are pilots with a same amplitude but inverse phases, $-p_7$ and $p_7$ are pilots with a same amplitude but inverse phases, and $-p_8$ and $p_8$ are pilots with a same amplitude but inverse phases.

According to the pilot transmission method provided in Embodiment 5 of the present invention, the pilot transmission notification, the two symbol period groups, and the multiple continuous symbol period groups are further described in detail, so as to better reduce complexity of obtaining the phase deviation by the access station, and ensure phase deviation precision.

Embodiment 6

Figure 7:
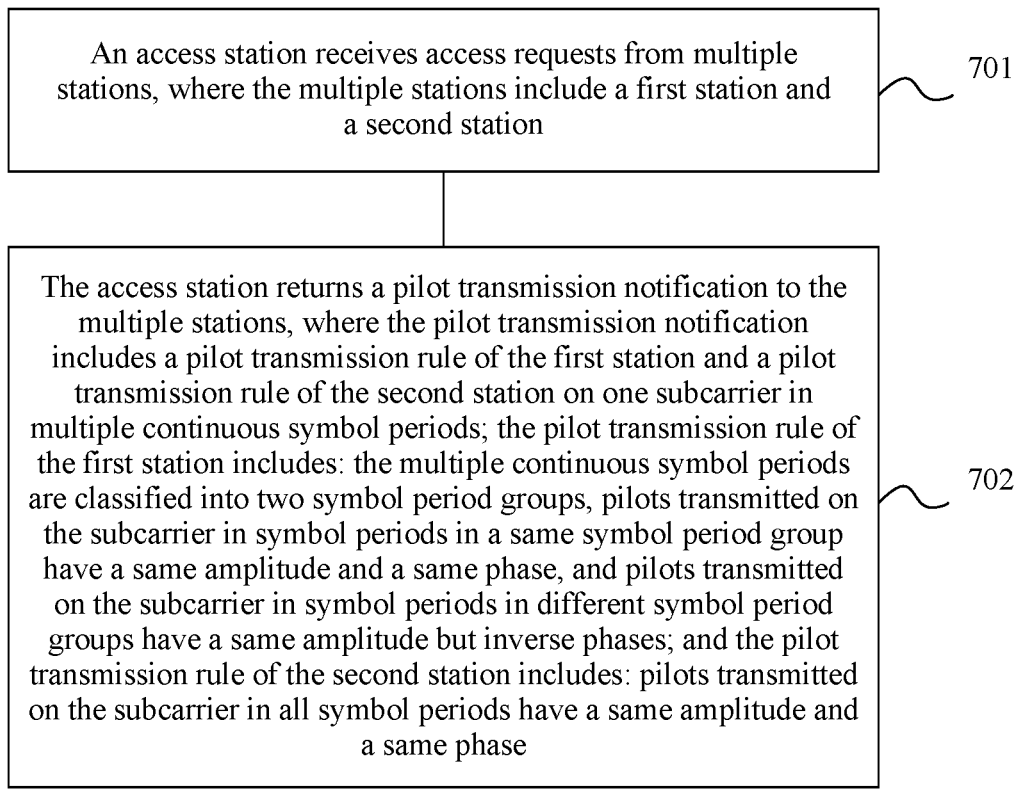
FIG. 7 is a flowchart of a pilot transmission method according to Embodiment 6 of the present invention.

Embodiment 6 of the present invention further provides a pilot transmission method. The method may be executed by an access station. FIG. 7 is a flowchart of the pilot transmission method according to Embodiment 6 of the present invention. As shown in FIG. 7, the method may include the following steps.

Step 701: The access station receives access requests from multiple stations, where the multiple stations include a first station and a second station.

Step 702: The access station returns a pilot transmission notification to the multiple stations, where the pilot transmission notification includes a pilot transmission rule of the first station and a pilot transmission rule of the second station on one subcarrier in multiple continuous symbol periods; the pilot transmission rule of the first station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the second station includes: pilots transmitted on the subcarrier in all symbol periods have a same amplitude and a same phase.

The pilot transmission method provided in Embodiment 6 of the present invention is a method executed by the access station and corresponding to the pilot transmission method described in Embodiment 5. A specific implementation process and beneficial effects of the method are similar to those in the foregoing embodiments, and details are not described herein.

Optionally, the method may further include:

The access station receives, on the subcarrier in the multiple continuous symbol periods, pilots transmitted by the multiple stations; and The access station calculates a phase deviation of each station in the multiple stations according to the pilots transmitted by the multiple stations and received on the subcarrier in the multiple continuous symbol periods.

The pilot transmission method provided in Embodiment 6 of the present invention is a method executed by the access station and corresponding to the pilot transmission method described in Embodiment 5. A specific implementation process and beneficial effects of the method are similar to those in the foregoing embodiments, and details are not described herein.

Embodiment 7

Figure 8:
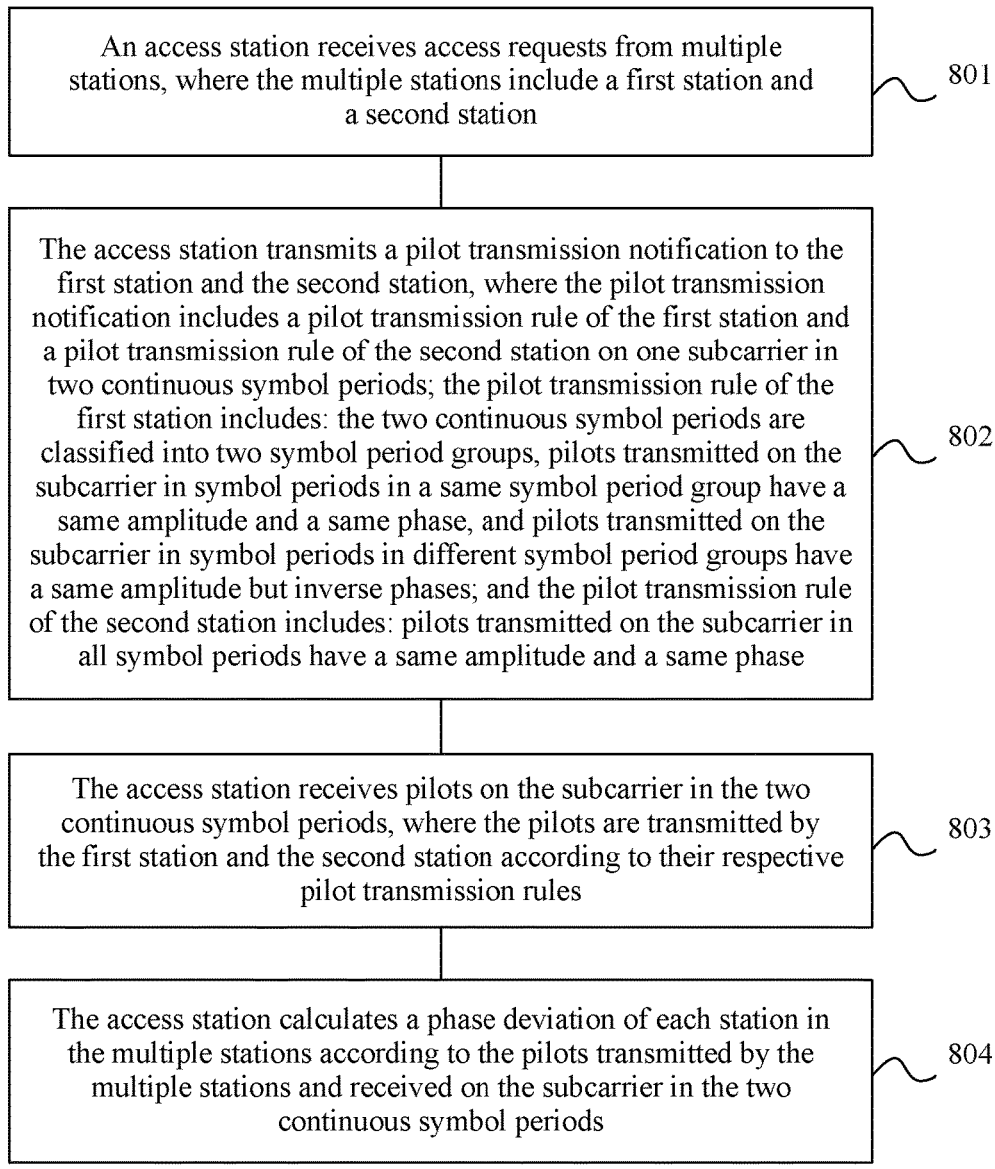
FIG. 8 is a flowchart of a pilot transmission method according to Embodiment 7 of the present invention.

Embodiment 7 of the present invention further provides a flowchart of a pilot transmission method. In Embodiment 7 of the present invention, the method described in Embodiment 4 is described by using an instance in which a network system includes two stations and one access station. FIG. 8 is a flowchart of the pilot transmission method according to Embodiment 7 of the present invention. As shown in FIG. 8, the method may include the following steps.

Step 801: An access station receives access requests from multiple stations, where the multiple stations include a first station and a second station.

Step 802: The access station transmits a pilot transmission notification to the first station and the second station, where the pilot transmission notification includes a pilot transmission rule of the first station and a pilot transmission rule of the second station on one subcarrier in two continuous symbol periods; the pilot transmission rule of the first station includes: the two continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the second station includes: pilots transmitted on the subcarrier in all symbol periods have a same amplitude and a same phase.

Specifically, in the two symbol period groups into which the two continuous symbol periods are classified, each symbol period group may include one symbol period. The two continuous symbol periods may be two symbol periods numbered k and k+1 respectively. One subcarrier in the two continuous symbol periods may be a subcarrier numbered i, and the subcarrier numbered i may be any pilot subcarrier. The pilot transmitted by the first station may be $p_1$, and the pilot transmitted by the second station may be $p_2$.

Therefore, the pilot transmission rules of the first station and the second station may be shown in Table 28:

TABLE 28

| Symbol period | Subcarrier serial number | First station | Second station |
|---|---|---|---|
| k | i | $p_1$ | $P_2$ |
| k + 1 | i | $-p_1$ | $P_2$ |

In the table, $-p_1$ and $p_1$ are pilots with a same amplitude but inverse phases.

Step 803: The access station receives pilots on the subcarrier in the two continuous symbol periods, where the pilots are transmitted by the first station and the second station according to their respective pilot transmission rules.

Step 804: The access station calculates a phase deviation of each station in the multiple stations according to the pilots transmitted by the multiple stations and received on the subcarrier in the two continuous symbol periods.

Specifically, the pilots transmitted by the multiple stations and received by the access station on the subcarrier in the two continuous symbol periods are hybrid signals received on the subcarrier in the two continuous symbol periods.

A hybrid signal received by the access station on the subcarrier numbered i in the symbol period numbered k may be denoted by $Y_k$, and a hybrid signal received by the access station on the subcarrier numbered i in the symbol period numbered k+1 may be denoted by $Y_{k+1}$. If the access station includes two receive antennas, the channel information from the first station to the two receive antennas may be denoted by $h_{11}$ and $h_{21}$, and the channel information from the second station to the two receive antennas may be denoted by $h_{12}$ and $h_{22}$. The phase deviation of the first station may be denoted by $\varphi_1$, and the phase deviation of the second station may be denoted by $\varphi_2$.

$Y_i$ may be denoted by Formula (9), and $Y_{i+1}$ may be denoted by Formula (10).

$$Y_k = \begin{bmatrix} p_1 h_{11}(k) & p_2 h_{12}(k) \\ p_1 h_{21}(k) & p_2 h_{22}(k) \end{bmatrix} \begin{bmatrix} \varphi_1 \\ \varphi_2 \end{bmatrix}; \text{ and} \quad (9)$$

$$Y_{k+1} = \begin{bmatrix} -p_1 h_{11}(k+1) & p_2 h_{12}(k+1) \\ -p_1 h_{21}(k+1) & p_2 h_{22}(k+1) \end{bmatrix} \begin{bmatrix} \varphi_1 \\ \varphi_2 \end{bmatrix}. \quad (10)$$

The access station determines the phase deviation of each station, for example, by calculating $\varphi_1$ and $\varphi_2$ in Formula (9) and Formula (10). Because the channel information on continuous subcarriers is the same, $h_{11}$ (k) is the same as $h_{11}$ (k+1), $h_{21}$ (k) is the same as $h_{21}$ (k+1), $h_{12}$ (k) is the same as $h_{12}$ (k+1), and $h_{22}$ (k) is the same as $h_{22}$ (k+1) in the foregoing formulas.

In Embodiment 7 of the present invention, in the pilot transmission rule used by the first station, the pilots transmitted on the subcarrier in symbol periods in different symbol period groups have the same amplitude but inverse phases. In the pilot transmission rule used by the second station, the pilots transmitted on the subcarrier in symbol periods in different symbol period groups have the same amplitude and the same phase. Therefore, some pilots may be cancelled out by performing an addition operation on Formula (9) and Formula (10) or a subtraction operation on Formula (9) and Formula (10), so as to obtain Formula (11) and Formula (12).

$$Y_k + Y_{k+1} = \begin{bmatrix} 2p_2 h_{12}(k) \\ 2p_2 h_{22}(k) \end{bmatrix} \varphi_2; \text{ and} \quad (11)$$

$$Y_k - Y_{k+1} = \begin{bmatrix} 2p_1 h_{11}(k) \\ 2p_1 h_{21}(k) \end{bmatrix} \varphi_1. \quad (12)$$

Because the pilot transmission rules of the first station and the second station in Embodiment 7 of the present invention can perform pilot cancellation, two-variable linear equations shown in Formula (9) and Formula (10) are simplified into two one-variable linear equations shown in Formula (11) and Formula (12), thereby reducing complexity of obtaining the phase deviation by the access station.

Figure 9:
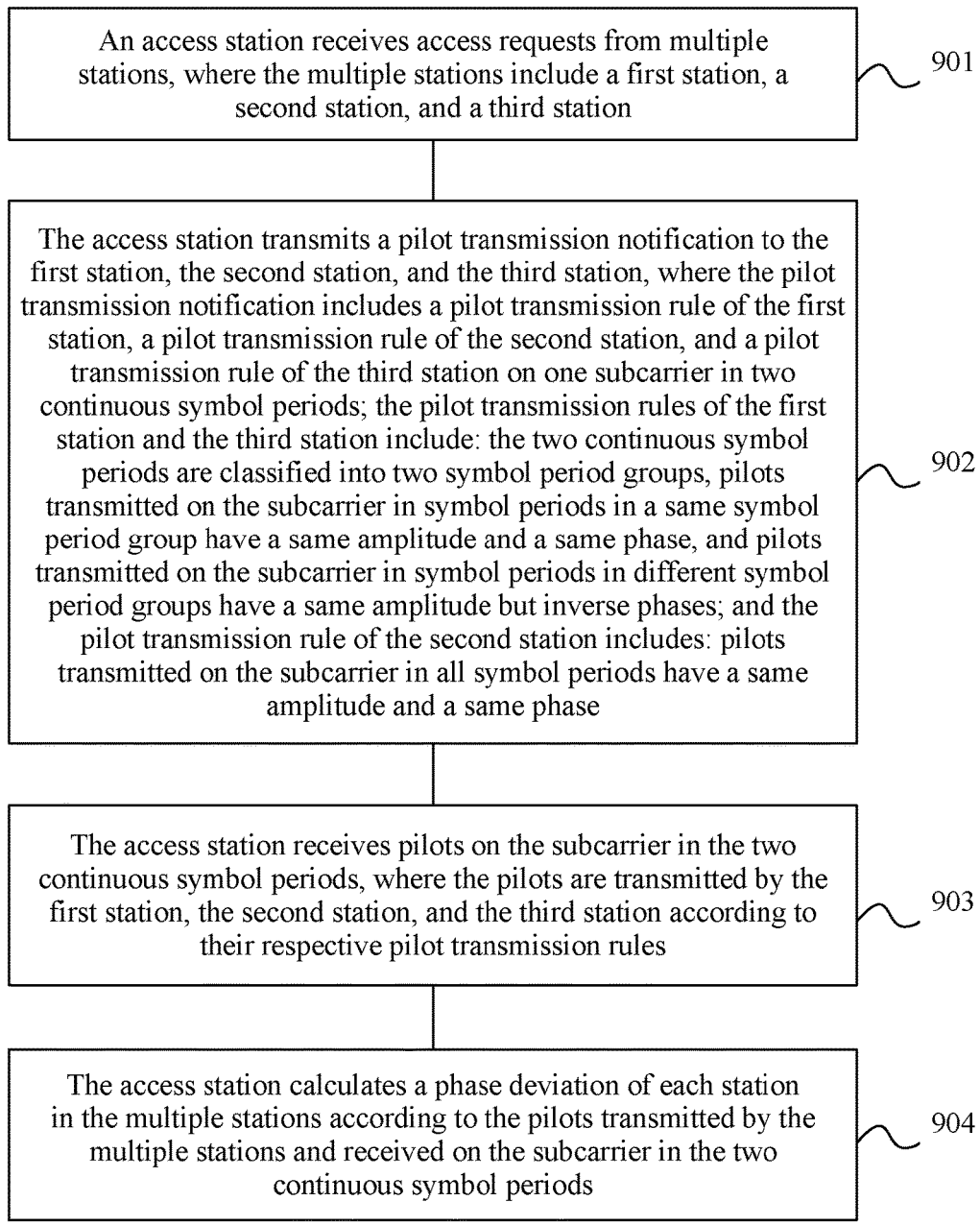
FIG. 9 is a flowchart of a pilot transmission method according to Embodiment 7 of the present invention.

Embodiment 7 of the present invention further provides a pilot transmission method. Specifically, the method described in Embodiment 4 is described by using an instance in which a network system includes three stations and one access station. FIG. 9 is a flowchart of a pilot transmission method according to Embodiment 7 of the present invention. As shown in FIG. 9, the method may include the following steps.

Step 901: An access station receives access requests from multiple stations, where the multiple stations include a first station, a second station, and a third station.

Step 902: The access station transmits a pilot transmission notification to the first station, the second station, and the third station, where the pilot transmission notification includes a pilot transmission rule of the first station, a pilot transmission rule of the second station, and a pilot transmission rule of the third station on one subcarrier in two continuous symbol periods; the pilot transmission rules of the first station and the third station include: the two continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the second station includes: pilots transmitted on the subcarrier in all symbol periods have a same amplitude and a same phase.

In the two symbol period groups into which the two continuous symbol periods are classified, each symbol period group may include one symbol period. The two continuous symbol periods may be two symbol periods numbered k and k+1 respectively. The one subcarrier in the two continuous symbol periods may be a subcarrier numbered i. The subcarrier numbered i may be any pilot subcarrier. A pilot transmitted by the first station may be $p_1$, a pilot transmitted by the second station is $p_2$, and a pilot transmitted by the third station may be $p_3$.

Therefore, the pilot transmission rules of the first station, the second station, and the third station may be shown in Table 29:

TABLE 29

| Symbol period | Subcarrier serial number | First station | Second station | Third station |
| --- | --- | --- | --- | --- |
| k | i | $p_1$ | $p_2$ | $p_3$ |
| k + 1 | i | $-p_1$ | $p_2$ | $-p_3$ |

In the table, $-p_1$ and $p_1$ are pilots with a same amplitude but inverse phases, and $-p_3$ and $p_3$ are pilots with a same amplitude but inverse phases.

It should be noted that in the pilot transmission rule of each station on the subcarrier in the two continuous symbol periods, which is included in the pilot transmission notification in step 902. The pilot transmission rule of the first station includes: the two continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases. The pilot transmission rules of the second station and the third station include: pilots transmitted on the subcarrier in all symbol periods have a same amplitude and a same phase. Correspondingly, the pilot transmission rules of the first station, the second station, and the third station may be shown in Table 30:

TABLE 30

| Symbol period | Subcarrier serial number | First station | Second station | Third station |
| --- | --- | --- | --- | --- |
| k | i | $p_1$ | $p_2$ | $p_3$ |
| k + 1 | i | $-p_1$ | $p_2$ | $p_3$ |

In the table, $-p_1$ and $p_1$ are pilots with a same amplitude but inverse phases. In each method provided in Embodiment 4 of the present invention, the two continuous subcarriers may be subcarriers numbered k+1 and k+2.

If the pilot transmission rules of the first station, the second station, and the third station are shown in Table 30, a specific implementation process is similar to the foregoing process, and may be obtained by simply making adaptive adjustment. In addition, a specific implementation process of two subcarriers numbered k+1 and k+2 is similar to the implementation process of subcarriers numbered k and k+1, and details are not described herein.

Step 903: The access station receives pilots on the subcarrier in the two continuous symbol periods, where the pilots are transmitted by the first station, the second station, and the third station according to their respective pilot transmission rules.

Step 904: The access station calculates a phase deviation of each station in the multiple stations according to the pilots transmitted by the multiple stations and received on the subcarrier in the two continuous symbol periods.

Specifically, the pilots transmitted by the multiple stations and received by the access station on the subcarrier in the two continuous symbol periods are hybrid signals received on the subcarrier in the two continuous symbol periods.

A hybrid signal received by the access station on the subcarrier numbered i in the symbol period numbered k may be denoted by $Y_k$, and a hybrid signal received by the access station on the subcarrier numbered i in the symbol period numbered k+1 may be denoted by $Y_{k+1}$. If the access station includes three receive antennas, the channel information from the first station to the three receive antennas may be denoted by $h_{11}$, $h_{21}$, and $h_{31}$, the channel information from the second station to the three receive antennas may be denoted by $h_{12}$, $h_{22}$, and $h_{32}$, the phase deviation of the first station may be denoted by $\varphi_1$, the phase deviation of the second station may be denoted by $\varphi_2$, and the phase deviation of the third station may be denoted by $\varphi_3$.

$Y_i$ may be denoted by Formula (13), and $Y_{i+1}$ may be denoted by Formula (14).

$$Y_k = \begin{bmatrix} p_1 h_{11}(k) & p_2 h_{12}(k) & p_3 h_{13}(k) \\ p_1 h_{21}(k) & p_2 h_{22}(k) & p_3 h_{23}(k) \\ p_1 h_{31}(k) & p_2 h_{32}(k) & p_3 h_{33}(k) \end{bmatrix} \begin{bmatrix} \varphi_1 \\ \varphi_2 \\ \varphi_3 \end{bmatrix}; \text{ and} \quad (13)$$

$$Y_{k+1} = \begin{bmatrix} -p_1 h_{11}(k+1) & p_2 h_{12}(k+1) & -p_3 h_{13}(k+1) \\ -p_1 h_{21}(k+1) & p_2 h_{22}(k+1) & -p_3 h_{23}(k+1) \\ -p_1 h_{31}(k+1) & p_2 h_{32}(k+1) & -p_3 h_{33}(k+1) \end{bmatrix} \begin{bmatrix} \varphi_1 \\ \varphi_2 \\ \varphi_3 \end{bmatrix}. \quad (14)$$

The access station determines the phase deviation of each station, for example, by calculating $\varphi_1$, $\varphi_2$, and $\varphi_3$ in Formula (13) and Formula (14).

Because the channel information on continuous subcarriers is the same, $h_{11}$ (k) is the same as $h_{11}$ (k+1), $h_{21}$ (k) is the same as $h_{21}$ (k+1), $h_{31}$ (k) is the same as $h_{31}$ (k+1), $h_{12}$ (k) is the same as $h_{12}$ (k+1), $h_{22}$ (k) is the same as $h_{22}$ (k+1), $h_{32}$ (k) is the same as $h_{32}$ (k+1), $h_{13}$ (k) is the same as $h_{13}$ (k+1), $h_{23}$ (k) is the same as $h_{23}$ (k+1), and $h_{33}$ (k) is the same as $h_{33}$ (k+1).

In Embodiment 7 of the present invention, in the pilot transmission rules used by the first station and the third station, the pilots transmitted on the subcarrier in symbol periods in different symbol period groups have the same amplitude but inverse phases. In the pilot transmission rule used by the second station, the pilots transmitted on the subcarrier in symbol periods in different symbol period groups have the same amplitude and the same phase. Therefore, pilots may be cancelled out by performing an addition operation on Formula (13) and Formula (14) or a subtraction operation on Formula (13) and Formula (14), so as to obtain Formula (15) and Formula (16).

$$Y_k + Y_{k+1} = \begin{bmatrix} 2p_2 h_{12}(k) \\ 2p_2 h_{22}(k) \\ 2p_2 h_{32}(k) \end{bmatrix} \varphi_2; \text{ and} \quad (15)$$

$$Y_k - Y_{k+1} = \begin{bmatrix} 2p_1 h_{11}(k) & 2p_3 h_{13}(k) \\ 2p_1 h_{21}(k) & 2p_3 h_{23}(k) \\ 2p_1 h_{31}(k) & 2p_3 h_{33}(k) \end{bmatrix} \begin{bmatrix} \varphi_1 \\ \varphi_3 \end{bmatrix}. \quad (16)$$

Because the pilot transmission rules of stations in Embodiment 5 of the present invention can perform pilot cancellation, three-variable linear equations shown in Formula (13) and Formula (14) are simplified into one one-variable linear equation and one two-variable linear equation shown in Formula (15) and Formula (16), thereby reducing complexity of obtaining the phase deviation by the access station.

It should be noted that, according to the pilot transmission method provided in Embodiment 7 of the present invention, complexity of calculating the phase deviation of stations in 4-station, 8-station and more-station scenarios may also be reduced, and an implementation process is similar to that in Embodiment 4 of the present invention, and details are not described herein.

For example, if the network system includes four stations: a first station, a second station, a third station, and a fourth station, pilots of the four stations may be $p_1$, $p_2$, $p_3$, and $p_4$ respectively.

The multiple continuous symbol periods may be symbol periods numbered k and k+1, the subcarrier in the multiple continuous symbol periods is a subcarrier numbered i, and the subcarrier numbered i is any pilot subcarrier. Therefore, in the pilot transmission notification transmitted by the access station to the four stations, pilot transmission rules of the first station, the second station, the third station, and the fourth station may be shown in Table 31:

TABLE 31

| Symbol period | Subcarrier serial number | First station | Second station | Third station | Fourth station |
|---|---|---|---|---|---|
| K | i | $p_1$ | $p_2$ | $p_3$ | $p_4$ |
| K + 1 | i | $p_1$ | $p_2$ | $-p_3$ | $-p_4$ |

In the table, $-p_3$ and $p_3$ are pilots with a same amplitude but inverse phases, and $-p_4$ and $p_4$ are pilots with a same amplitude but inverse phases.

If the multiple continuous symbol periods may be symbol periods numbered k+1 and k+2, and the subcarrier in the multiple continuous symbol periods is a subcarrier numbered i, the pilot transmission rules of the first station, the second station, the third station, and the fourth station may be shown in Table 32:

TABLE 32

| Symbol period | Subcarrier serial number | First station | Second station | Third station | Fourth station |
|---|---|---|---|---|---|
| k + 1 | i | $p_1$ | $p_2$ | $-p_3$ | $-p_4$ |
| k + 2 | i | $p_1$ | $-p_2$ | $-p_3$ | $p_4$ |

In the table, $-p_2$ and $p_2$ are pilots with a same amplitude but inverse phases, and $-p_4$ and $p_4$ are pilots with a same amplitude but inverse phases.

If the multiple continuous symbol periods may be symbol periods numbered k+2 and k+3, and the subcarrier in the multiple continuous symbol periods is a subcarrier numbered i, the pilot transmission rules of the first station, the second station, the third station, and the fourth station may be shown in Table 33:

TABLE 33

| Symbol period | Subcarrier serial number | First station | Second station | Third station | Fourth station |
|---|---|---|---|---|---|
| k + 2 | i | $p_1$ | $-p_2$ | $-p_3$ | $p_4$ |
| k + 3 | i | $p_1$ | $-p_2$ | $p_3$ | $-p_4$ |

In the table, $-p_3$ and $p_3$ are pilots with a same amplitude but inverse phases, and $-p_4$ and $p_4$ are pilots with a same amplitude but inverse phases.

If the network system includes eight stations: a first station, a second station, a third station, a fourth station, a fifth station, a sixth station, a seventh station, and an eighth station, pilots of the eight stations may be $p_1$, $p_2$, $p_3$, $p_4$, $p_5$, $p_6$, $p_7$, and $p_8$ respectively.

If the multiple continuous symbol periods may be symbol periods numbered k and k+1, and the subcarrier in the multiple continuous symbol periods is a subcarrier numbered i, pilot transmission rules of the first station, the second station, the third station, the fourth station, the fifth station, the sixth station, the seventh station, and the eighth station may be shown in Table 34:

TABLE 34

| Symbol period | Subcarrier serial number | First station | Second station | Third station | Fourth station | Fifth station | Sixth station | Seventh station | Eighth station |
|---|---|---|---|---|---|---|---|---|---|
| k | i | $p_1$ | $p_2$ | $p_3$ | $p_4$ | $p_5$ | $p_6$ | $p_7$ | $p_8$ |
| k + 1 | i | $p_1$ | $p_2$ | $-p_3$ | $-p_4$ | $p_5$ | $p_6$ | $-p_7$ | $-p_8$ |

In the table, $-p_3$ and $p_3$ are pilots with a same amplitude but inverse phases, $-p_4$ and $p_4$ are pilots with a same amplitude but inverse phases, $-p_7$ and $p_7$ are pilots with a same amplitude but inverse phases, and $-p_8$ and $p_8$ are pilots with a same amplitude but inverse phases.

If the multiple continuous symbol periods may be symbol periods numbered k+1 and k+2, and the subcarrier in the multiple continuous symbol periods is a subcarrier numbered i, the pilot transmission rules of the first station, the second station, the third station, the fourth station, the fifth station, the sixth station, the seventh station, and the eighth station may be shown in Table 35:

TABLE 35

| Symbol period | Subcarrier serial number | First station | Second station | Third station | Fourth station | Fifth station | Sixth station | Seventh station | Eighth station |
|---|---|---|---|---|---|---|---|---|---|
| k + 1 | i | $p_1$ | $p_2$ | $-p_3$ | $-p_4$ | $p_5$ | $p_6$ | $-p_7$ | $-p_8$ |
| k + 2 | i | $p_1$ | $-p_2$ | $-p_3$ | $p_4$ | $p_5$ | $-p_6$ | $-p_7$ | $p_8$ |

In the table, $-p_2$ and $p_2$ are pilots with a same amplitude but inverse phases, $-p_4$ and $p_4$ are pilots with a same amplitude but inverse phases, $-p_6$ and $p_6$ are pilots with a same amplitude but inverse phases, $-p_8$ and $p_8$ are pilots with a same amplitude but inverse phases.

If the multiple continuous symbol periods may be symbol periods numbered k+2 and k+3, and the subcarrier in the multiple continuous symbol periods is a subcarrier numbered i, the pilot transmission rules of the first station, the second station, the third station, the fourth station, the fifth station, the sixth station, the seventh station, and the eighth station may be shown in Table 36:

TABLE 36

| Symbol period | Subcarrier serial number | First station | Second station | Third station | Fourth station | Fifth station | Sixth station | Seventh station | Eighth station |
|---|---|---|---|---|---|---|---|---|---|
| k + 2 | i | $p_1$ | $-p_2$ | $-p_3$ | $p_4$ | $p_5$ | $-p_6$ | $-p_7$ | $p_8$ |
| k + 3 | i | $p_1$ | $-p_2$ | $p_3$ | $-p_4$ | $p_5$ | $-p_6$ | $p_7$ | $-p_8$ |

In the table, $-p_3$ and $p_3$ are pilots with a same amplitude but inverse phases, $-p_4$ and $p_4$ are pilots with a same amplitude but inverse phases, $-p_7$ and $p_7$ are pilots with a same amplitude but inverse phases, and $-p_8$ and $p_8$ are pilots with a same amplitude but inverse phases.

If the multiple continuous symbol periods may be symbol periods numbered k+3 and k+4, and the subcarrier in the multiple continuous symbol periods is a subcarrier numbered i, the pilot transmission rules of the first station, the second station, the third station, the fourth station, the fifth station, the sixth station, the seventh station, and the eighth station may be shown in Table 37:

TABLE 37

| Symbol period | Subcarrier serial number | First station | Second station | Third station | Fourth station | Fifth station | Sixth station | Seventh station | Eighth station |
|---|---|---|---|---|---|---|---|---|---|
| k + 3 | i | $p_1$ | $-p_2$ | $p_3$ | $-p_4$ | $p_5$ | $-p_6$ | $p_7$ | $-p_8$ |
| k + 4 | i | $p_1$ | $p_2$ | $p_3$ | $p_4$ | $-p_5$ | $-p_6$ | $-p_7$ | $-p_8$ |

In the table, $-p_2$ and $p_2$ are pilots with a same amplitude but inverse phases, $-p_4$ and $p_4$ are pilots with a same amplitude but inverse phases, $-p_5$ and $p_5$ are pilots with a same amplitude but inverse phases, and $-p_7$ and $p_7$ are pilots with a same amplitude but inverse phases.

If the multiple continuous symbol periods may be symbol periods numbered k+4 and k+5, and the subcarrier in the multiple continuous symbol periods is a subcarrier numbered i, the pilot transmission rules of the first station, the second station, the third station, the fourth station, the fifth station, the sixth station, the seventh station, and the eighth station may be shown in Table 38:

TABLE 38

| Symbol period | Subcarrier serial number | First station | Second station | Third station | Fourth station | Fifth station | Sixth station | Seventh station | Eighth station |
|---|---|---|---|---|---|---|---|---|---|
| k + 4 | i | $p_1$ | $p_2$ | $p_3$ | $p_4$ | $-p_5$ | $-p_6$ | $-p_7$ | $-p_8$ |
| k + 5 | i | $p_1$ | $p_2$ | $-p_3$ | $-p_4$ | $-p_5$ | $-p_6$ | $p_7$ | $p_8$ |

In the table, $-p_3$ and $p_3$ are pilots with a same amplitude but inverse phases, $-p_4$ and $p_4$ are pilots with a same amplitude but inverse phases, $-p_7$ and $p_7$ are pilots with a same amplitude but inverse phases, and $-p_8$ and $p_8$ are pilots with a same amplitude but inverse phases.

If the multiple continuous symbol periods may be symbol periods numbered k+5 and k+6, and the subcarrier in the multiple continuous symbol periods is a subcarrier numbered i, the pilot transmission rules of the first station, the second station, the third station, the fourth station, the fifth station, the sixth station, the seventh station, and the eighth station may be shown in Table 39:

TABLE 39

| Symbol period | Subcarrier serial number | First station | Second station | Third station | Fourth station | Fifth station | Sixth station | Seventh station | Eighth station |
|---|---|---|---|---|---|---|---|---|---|
| k + 5 | i | $p_1$ | $p_2$ | $-p_3$ | $-p_4$ | $-p_5$ | $-p_6$ | $p_7$ | $p_8$ |
| k + 6 | i | $p_1$ | $-p_2$ | $-p_3$ | $p_4$ | $-p_5$ | $p_6$ | $p_7$ | $-p_8$ |

In the table, $-p_2$ and $p_2$ are pilots with a same amplitude but inverse phases, $-p_4$ and $p_4$ are pilots with a same amplitude but inverse phases, $-p_6$ and $p_6$ are pilots with a same amplitude but inverse phases, $-p_8$ and $p_8$ are pilots with a same amplitude but inverse phases.

If the multiple continuous symbol periods may be symbol periods numbered k+6 and k+7, and the subcarrier in the multiple continuous symbol periods is a subcarrier numbered i, the pilot transmission rules of the first station, the second station, the third station, the fourth station, the fifth station, the sixth station, the seventh station, and the eighth station may be shown in Table 40:

TABLE 40

| Symbol period | Subcarrier serial number | First station | Second station | Third station | Fourth station | Fifth station | Sixth station | Seventh station | Eighth station |
|---|---|---|---|---|---|---|---|---|---|
| k + 6 | i | $p_1$ | $-p_2$ | $-p_3$ | $p_4$ | $-p_5$ | $p_6$ | $p_7$ | $-p_8$ |
| k + 7 | i | $p_1$ | $-p_2$ | $p_3$ | $-p_4$ | $-p_5$ | $p_6$ | $-p_7$ | $p_8$ |

In the table, $-p_3$ and $p_3$ are pilots with a same amplitude but inverse phases, $-p_4$ and $p_4$ are pilots with a same amplitude but inverse phases, $-p_7$ and $p_7$ are pilots with a same amplitude but inverse phases, and $-p_8$ and $p_8$ are pilots with a same amplitude but inverse phases.

If the pilot transmission rules of all the stations are shown in Table 31 to Table 40, a specific implementation process is similar to the foregoing process, and may be obtained by simply making adaptive adjustment. The specific implementation process is similar to the process of calculating the phase deviation of three stations in Embodiment 7 of the present invention, and details are not described herein.

Embodiment 8

Figure 10:
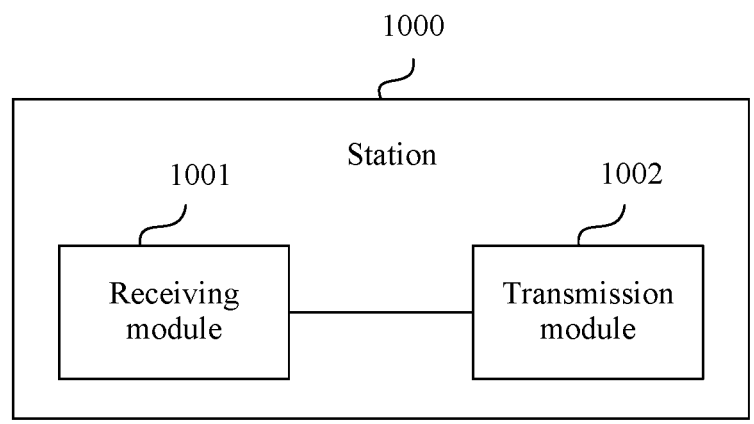
FIG. 10 is a schematic structural diagram of a station according to Embodiment 8 of the present invention.

Embodiment 8 of the present invention further provides a station. FIG. 10 is a schematic structural diagram of the station according to Embodiment 8 of the present invention.

As shown in FIG. 10, the station 1000 includes:

a receiving module 1001, configured to receive a pilot transmission notification from an access point, where the pilot transmission notification includes a pilot transmission rule of the station and a pilot transmission rule of another station on a group of continuous subcarriers; the pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the another station includes: pilots transmitted on all subcarriers have a same amplitude and a same phase; and a transmission module 1002, configured to transmit a pilot according to the pilot transmission rule of the station.

The pilot transmission notification and the group of continuous subcarriers may be similar to those in either Embodiment 1 or Embodiment 2, and details are not described herein.

The station provided in Embodiment 8 of the present invention can execute a method similar to that in either Embodiment 1 or Embodiment 2, and details are not described herein.

Embodiment 9

Figure 11:
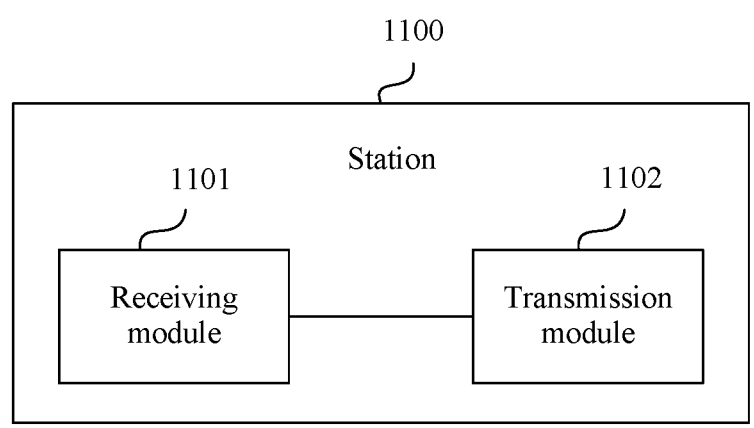
FIG. 11 is a schematic structural diagram of a station according to Embodiment 9 of the present invention.

Embodiment 9 of the present invention further provides a station. FIG. 11 is a schematic structural diagram of the station according to Embodiment 9 of the present invention.

As shown in FIG. 11, the station 1100 may include:
- a receiving module 1101, configured to receive a pilot transmission notification from an access point, where the pilot transmission notification includes a pilot transmission rule of the station and a pilot transmission rule of another station on one subcarrier in multiple continuous symbol periods; the pilot transmission rule of the station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the another station includes: pilots transmitted on the subcarrier in all symbol periods have a same amplitude and a same phase; and
- a transmission module 1102, configured to transmit a pilot according to the pilot transmission rule of the station.

The pilot transmission notification and the multiple continuous symbol periods may be similar to those in Embodiment 5, and details are not described herein.

The station provided in Embodiment 9 of the present invention can execute a method similar to that in Embodiment 5, and details are not described herein.

Embodiment 10

Figure 12:
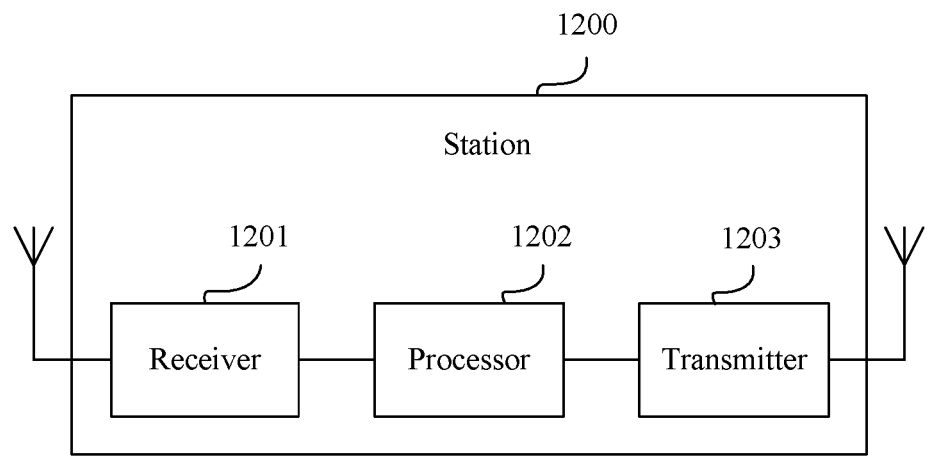
FIG. 12 is a schematic structural diagram of a station according to Embodiment 10 of the present invention.

Embodiment 10 of the present invention further provides a station. FIG. 12 is a schematic structural diagram of the station according to Embodiment 10 of the present invention.

As shown in FIG. 12, the station 1200 includes a receiver 1201, a processor 1202, and a transmitter 1203.

The receiver 1201 is configured to receive a pilot transmission notification from an access point. The pilot transmission notification includes a pilot transmission rule of the station and a pilot transmission rule of another station on a group of continuous subcarriers. The pilot transmission rule of the station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases. The pilot transmission rule of the another station includes: pilots transmitted on all subcarriers have a same amplitude and a same phase.

The transmitter 1203 is configured to transmit a pilot according to the pilot transmission rule of the station.

The pilot transmission notification and the group of continuous subcarriers may be similar to those in either Embodiment 1 or Embodiment 2, and details are not described herein.

The station provided in Embodiment 10 of the present invention can execute a method similar to that in either Embodiment 1 or Embodiment 2, and details are not described herein.

Embodiment 11

Figure 13:
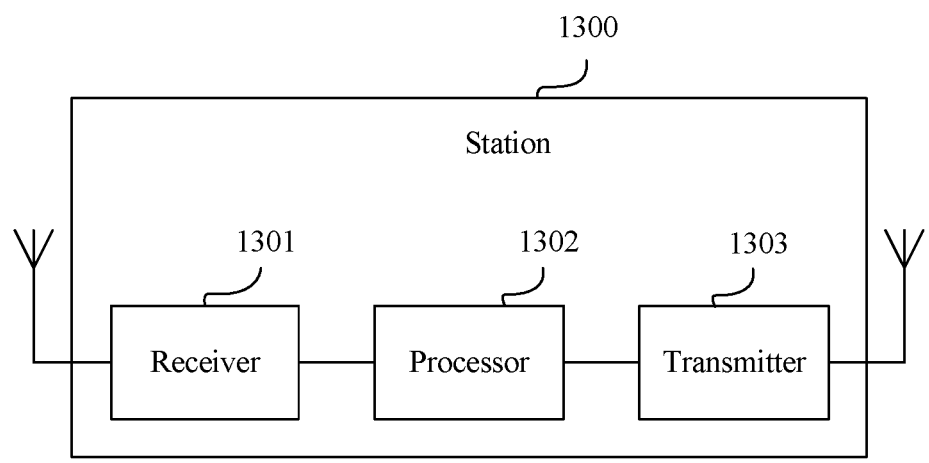
FIG. 13 is a schematic structural diagram of a station according to Embodiment 11 of the present invention.

Embodiment 11 of the present invention further provides a station. FIG. 13 is a schematic structural diagram of the station according to Embodiment 11 of the present invention.

As shown in FIG. 13, the station 1300 includes a receiver 1301, a processor 1302, and a transmitter 1303.

The receiver 1301 is configured to receive a pilot transmission notification from an access point. The pilot transmission notification includes a pilot transmission rule of the station and a pilot transmission rule of another station on one subcarrier in multiple continuous symbol periods. The pilot transmission rule of the station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases. The pilot transmission rule of the another station includes: pilots transmitted on the subcarrier in all symbol periods have a same amplitude and a same phase.

The transmitter 1303 is configured to transmit, a pilot according to the pilot transmission rule of the station.

The pilot transmission notification and the multiple continuous symbol periods may be similar to those in Embodiment 5, and details are not described herein.

The station provided in Embodiment 11 of the present invention can execute a method similar to that in Embodiment 5, and details are not described herein.

Embodiment 12

Figure 14:
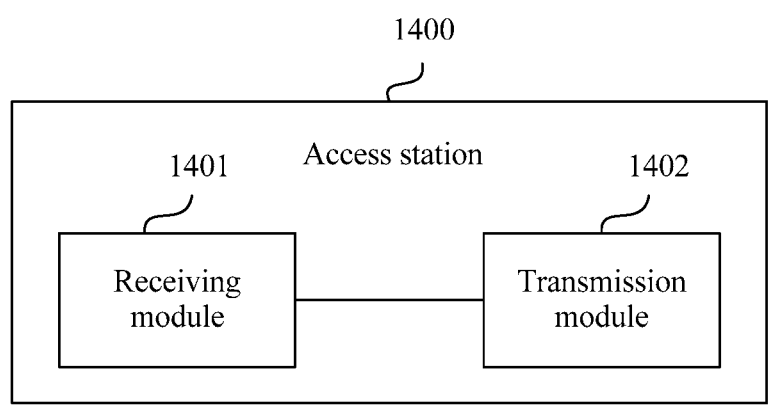
FIG. 14 is a schematic structural diagram of an access station according to Embodiment 12 of the present invention.

Embodiment 12 of the present invention provides an access station. FIG. 14 is a schematic structural diagram of the access station according to Embodiment 12 of the present invention.

As shown in FIG. 14, the access station 1400 may include:
- a receiving module 1401, configured to receive access requests from multiple stations, where the multiple stations include a first station and a second station; and
- a transmission module 1402, configured to return a pilot transmission notification to the multiple stations, where the pilot transmission notification includes a pilot transmission rule of the first station and a pilot transmission rule of the second station on a group of continuous subcarriers; the pilot transmission rule of the first station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases; and the pilot transmission rule of the second station includes: pilots transmitted on all subcarriers have a same amplitude and a same phase.

Optionally, the receiving module 1401 is further configured to receive, on each subcarrier in the group of continuous subcarriers, pilots transmitted by the multiple stations.

The access station 1400 may further include:
- a calculation module, configured to calculate a phase deviation of each station in the multiple stations according to the pilots transmitted by the multiple stations and received on each subcarrier in the group of continuous subcarriers.

The access station provided in Embodiment 12 of the present invention can execute a method similar to that in Embodiment 3 or Embodiment 4, and details are not described herein.

Embodiment 13

Figure 15:
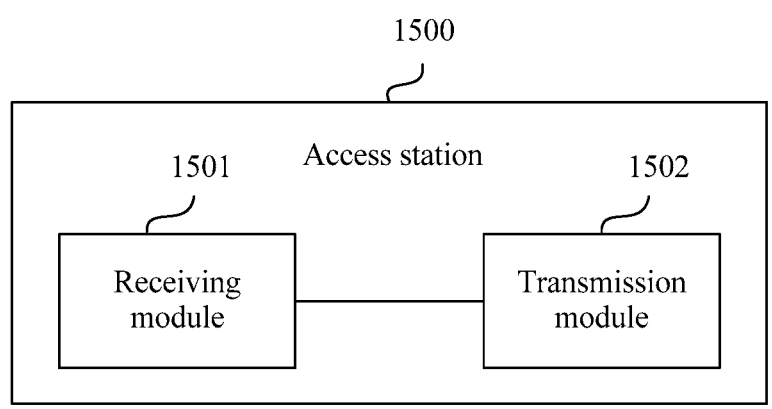
FIG. 15 is a schematic structural diagram of an access station according to Embodiment 13 of the present invention.

Embodiment 13 of the present invention further provides an access station. FIG. 15 is a schematic structural diagram of the access station according to Embodiment 13 of the present invention. As shown in FIG. 15, the access station 1500 may include:

a receiving module 1501, configured to receive access requests from multiple stations, where the multiple stations include a first station and a second station; and a transmission module 1502, configured to return a pilot transmission notification to the multiple stations, where the pilot transmission notification includes a pilot transmission rule of the first station and a pilot transmission rule of the second station on one subcarrier in multiple continuous symbol periods; the pilot transmission rule of the first station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases; and the pilot transmission rule of the second station includes: pilots transmitted on the subcarrier in all symbol periods have a same amplitude and a same phase.

Optionally, the receiving module 1501 is further configured to receive, on the subcarrier in the multiple continuous symbol periods, pilots transmitted by the multiple stations.

The access station 15010 may further include:

a calculation module, configured to calculate a phase deviation of each station in the multiple stations according to the pilots transmitted by the multiple stations and received on the subcarrier in the multiple continuous symbol periods.

The access station provided in Embodiment 13 of the present invention can execute a method similar to that in either Embodiment 6 or Embodiment 7, and details are not described herein.

Embodiment 14

Figure 16:
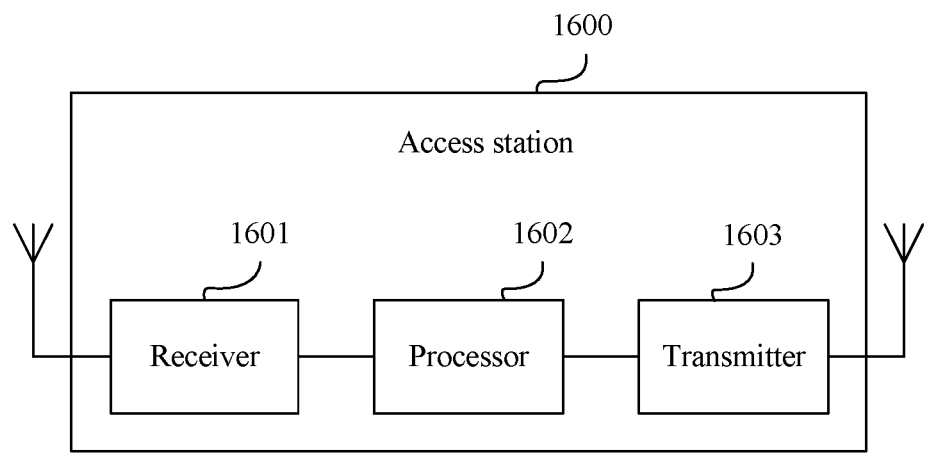
FIG. 16 is a schematic structural diagram of an access station according to Embodiment 14 of the present invention.

Embodiment 14 of the present invention further provides an access station. FIG. 16 is a schematic structural diagram of the access station according to Embodiment 14 of the present invention.

As shown in FIG. 16, the access station 1600 includes a receiver 1601, a processor 1602, and a transmitter 1603.

The receiver 1601 is configured to receive access requests from multiple stations, where the multiple stations include a first station and a second station.

The transmitter 1603 is configured to return a pilot transmission notification to the multiple stations. The pilot transmission notification includes a pilot transmission rule of the first station and a pilot transmission rule of the second station on a group of continuous subcarriers. The pilot transmission rule of the first station includes: the group of continuous subcarriers is divided into two subcarrier groups, pilots transmitted on subcarriers in a same subcarrier group have a same amplitude and a same phase, and pilots transmitted on subcarriers in different subcarrier groups have a same amplitude but inverse phases. The pilot transmission rule of the second station includes: pilots transmitted on all subcarriers have a same amplitude and a same phase.

Optionally, the receiver 1601 is further configured to receive, on each subcarrier in the group of continuous subcarriers, pilots transmitted by the multiple stations.

The processor 1602 is configured to calculate a phase deviation of each station in the multiple stations according to the pilots transmitted by the multiple stations and received on each subcarrier in the group of continuous subcarriers.

The access station provided in Embodiment 14 of the present invention can execute a method similar to that in either Embodiment 3 or Embodiment 4, and details are not described herein.

Embodiment 15

Figure 17:
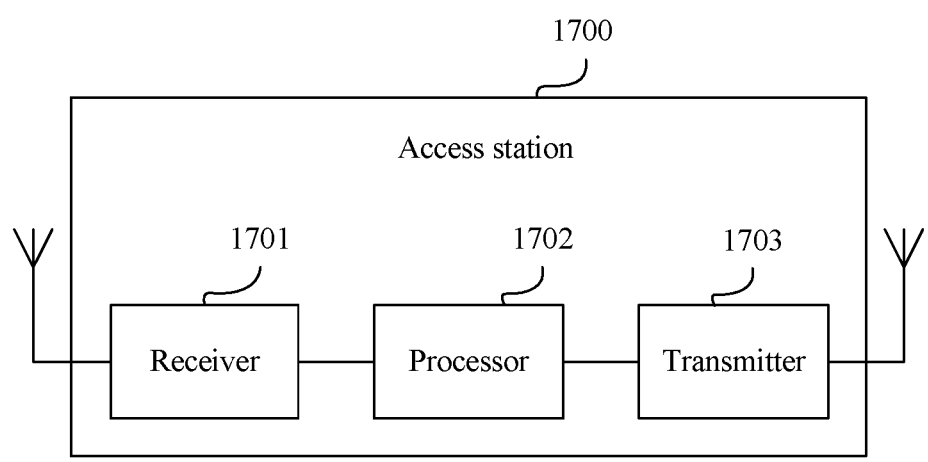
FIG. 17 is a schematic structural diagram of an access station according to Embodiment 15 of the present invention.

Embodiment 15 of the present invention further provides an access station. FIG. 17 is a schematic structural diagram of the access station according to Embodiment 15 of the present invention.

As shown in FIG. 17, an access station 1700 may include a receiver 1701, a processor 1702, and a transmitter 1703.

The receiver 1701 is configured to receive access requests from multiple stations, where the multiple stations include a first station and a second station.

The transmitter 1703 is configured to return a pilot transmission notification to the multiple stations. The pilot transmission notification includes a pilot transmission rule of the first station and a pilot transmission rule of the second station on one subcarrier in multiple continuous symbol periods. The pilot transmission rule of the first station includes: the multiple continuous symbol periods are classified into two symbol period groups, pilots transmitted on the subcarrier in symbol periods in a same symbol period group have a same amplitude and a same phase, and pilots transmitted on the subcarrier in symbol periods in different symbol period groups have a same amplitude but inverse phases. The pilot transmission rule of the second station includes: pilots transmitted on the subcarrier in all symbol periods have a same amplitude and a same phase.

Optionally, the receiver 1701 is further configured to receive, on the subcarrier in the multiple continuous symbol periods, pilots transmitted by the multiple stations.

The processor 1702 is configured to calculate a phase deviation of each station in the multiple stations according to the pilots transmitted by the multiple stations and received on the subcarrier in the multiple continuous symbol periods.

The access station provided in Embodiment 15 of the present invention can execute a method similar to that in either Embodiment 6 or Embodiment 7, and details are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A pilot transmission method comprising:
   receiving, by a station, a pilot transmission notification from an access point, wherein the pilot transmission notification comprises a pilot transmission rule of the station and pilot transmission rules of at least two other stations on a group of continuous subcarriers;

the pilot transmission rule of the station comprises dividing the group of continuous subcarriers into at least two subcarrier groups, transmitting first pilots having common amplitude and phase on subcarriers in a first one of the two subcarrier groups, and transmitting second pilots, having an amplitude common to the amplitude of the first pilots and a phase that is inverse to the phase of the first pilots, on subcarriers in a second one of the two subcarrier groups;

the pilot transmission rule of a first of the other stations comprises transmitting third pilots having common amplitude and phase on all subcarriers of the group of continuous subcarriers; and the pilot transmission rule of a second of the other stations comprises dividing the group of continuous subcarriers into at least two subcarrier groups, transmitting fourth pilots having common amplitude and phase on subcarriers in one of the at least two subcarrier groups, and transmitting fifth pilots having an amplitude common to the amplitude of the fourth pilots and a phase that is inverse to the phase of the fourth pilots on subcarriers in a second of the at least two subcarrier groups; and transmitting, by the station, a pilot according to the pilot transmission rule of the station.

2. The method according to claim 1, wherein in the two subcarrier groups, a quantity of subcarriers in one subcarrier group is equal to a quantity of subcarriers in the other subcarrier group.

3. The method according to claim 1, wherein in the two subcarrier groups, a quantity of subcarriers in one subcarrier group is one more than a quantity of subcarriers in the other subcarrier group.

4. The method according to claim 1, wherein the group of continuous subcarriers comprises two continuous subcarriers.

5. A pilot transmission method comprising:

receiving, by a station, a pilot transmission notification from an access point, wherein the pilot transmission notification comprises a pilot transmission rule of the station and pilot transmission rules of at least two other stations on a subcarrier in multiple continuous symbol periods;

the pilot transmission rule of the station comprises classifying the multiple continuous symbol periods into at least two symbol period groups, transmitting first pilots having common amplitude and phase on the subcarrier in symbol periods in a first one of the two symbol period groups, and transmitting second pilots, having an amplitude common to the amplitude of the first pilots and a phase that is inverse to the phase of the first pilots, on the subcarrier in symbol periods in a second one of the two symbol period groups;

the pilot transmission rule of a first of the other stations comprises transmitting third pilots having common amplitude and phase on the subcarrier in all of the symbol period groups; and and the pilot transmission rule of a second of the other stations comprises classifying the multiple continuous symbol periods into at least two symbol period groups, transmitting fourth pilots having common amplitude and phase on the subcarrier in symbol periods in a first one of the at least two symbol period groups, and transmit fifth pilots having an amplitude common to the amplitude of the fourth pilots and a phase that is inverse to the phase of the fourth pilots on the subcarrier in symbol periods in a second one of the two symbol period groups; and transmitting, by the station, a pilot according to the pilot transmission rule of the station.

6. The method according to claim 5, wherein in the two symbol period groups, a quantity of symbol periods in one symbol period group is equal to a quantity of symbol periods in the other symbol period group.

7. The method according to claim 5, wherein in the two symbol period groups, a quantity of symbol periods in one symbol period group is one more than a quantity of symbol periods in the other symbol period group.

8. The method according to claim 5, wherein the multiple continuous symbol periods comprise two continuous symbol periods.

9. A station comprising:

a processor, and a memory coupled to the processor, wherein the memory stores processor-executable instructions which when executed causes the processor to implement operations include:

receiving a pilot transmission notification from an access point, wherein the pilot transmission notification comprises a pilot transmission rule of the station and pilot transmission rules of at least two other stations on a group of continuous subcarriers;

the pilot transmission rule of the station comprises dividing the group of continuous subcarriers into at least two subcarrier groups, transmitting first pilots having common amplitude and phase on subcarriers in a first one of the two subcarrier groups, and transmitting second pilots, having an amplitude common to the amplitude of the first pilots and a phase that is inverse to the phase of the first pilots, on subcarriers in a second one of the two subcarrier groups; and the pilot transmission rule of the another station comprises transmitting third pilots having common amplitude and phase on all subcarriers of the group of continuous subcarriers; and the pilot transmission rule of a second of the other stations comprises dividing the group of continuous subcarriers into at least two subcarrier groups, transmitting fourth pilots having common amplitude and phase on subcarriers in one of the at least two subcarrier groups, and transmitting fifth pilots having an amplitude common to the amplitude of the fourth pilots and a phase that is inverse to the phase of the fourth pilots on subcarriers in a second of the at least two subcarrier groups; and transmitting a pilot according to the pilot transmission rule of the station.

10. The station according to claim 9, wherein in the two subcarrier groups, a quantity of subcarriers in one subcarrier group is equal to a quantity of subcarriers in the other subcarrier group.

11. The station according to claim 9, wherein in the two subcarrier groups, a quantity of subcarriers in one subcarrier group is one more than a quantity of subcarriers in the other subcarrier group.

12. The station according to claim 9, wherein the group of continuous subcarriers comprises two continuous subcarriers.

13. A station comprising:
a processor, and
a memory coupled to the processor, wherein the memory stores processor-executable instructions which when executed causes the processor to implement operations include:
receiving a pilot transmission notification from an access point, wherein the pilot transmission notification comprises a pilot transmission rule of the station and pilot transmission rules of at least two other stations on a subcarrier in multiple continuous symbol periods;
the pilot transmission rule of the station comprises classifying the multiple continuous symbol periods into at least two symbol period groups, transmitting first pilots having common amplitude and phase on the subcarrier in symbol periods in a first one of the two symbol groups, and transmitting second pilots, having an amplitude common to the amplitude of the first pilots and a phase that is inverse to the phase of the first pilots, on the subcarrier in symbol periods in a second one of the two different symbol period groups; and
the pilot transmission rule of the another station comprises transmitting third pilots having common amplitude and phase on the subcarrier in all of the symbol period groups; and
and the pilot transmission rule of a second of the other stations comprises classifying the multiple continuous symbol periods into at least two symbol period groups, transmitting fourth pilots having common amplitude and phase on the subcarrier in symbol periods in a first one of the at least two symbol period groups, and transmit fifth pilots having an amplitude common to the amplitude of the fourth pilots and a phase that is inverse to the phase of the fourth pilots on the subcarrier in symbol periods in a second one of the two symbol period groups; and
transmitting a pilot according to the pilot transmission rule of the station.

14. The station according to claim 13, wherein in the two symbol period groups, a quantity of symbol periods in one symbol period group is equal to a quantity of symbol periods in the other symbol period group.

15. The station according to claim 13, wherein in the two symbol period groups, a quantity of symbol periods in one symbol period group is one more than a quantity of symbol periods in the other symbol period group.

16. The station according to claim 13, wherein the multiple continuous symbol periods comprise two continuous symbol periods.

* * * * *